(12) United States Patent
Dalzell et al.

(10) Patent No.: US 7,497,369 B2
(45) Date of Patent: Mar. 3, 2009

(54) METADATA SERVICE THAT SUPPORTS USER-TO-USER SALES VIA THIRD PARTY WEB PAGES

(75) Inventors: Richard L. Dalzell, Greater Seattle, WA (US); Neil C. Roseman, Seattle, WA (US); Paul Kotas, Seattle, WA (US); Jeffrey P. Bezos, Greater Seattle, WA (US); Bruce C. Moore, Seattle, WA (US); Jeffrey M. Blackburn, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 1434 days.

(21) Appl. No.: 10/142,743

(22) Filed: May 9, 2002

(65) Prior Publication Data

US 2003/0204447 A1    Oct. 30, 2003

Related U.S. Application Data

(60) Provisional application No. 60/336,409, filed on Oct. 31, 2001, provisional application No. 60/351,207, filed on Jan. 22, 2002.

(51) Int. Cl.
*G06F 17/00* (2006.01)
*G06Q 30/00* (2006.01)

(52) U.S. Cl. .................. 235/375; 235/383; 705/26

(58) Field of Classification Search .............. 306/502; 705/26, 27; 235/375, 383, 385
See application file for complete search history.

(56) References Cited

U.S. PATENT DOCUMENTS 3,267,436 A * 8/1966 Alpert et al. ............ 705/15
4,992,940 A * 2/1991 Dworkin ................. 705/26

(Continued)

FOREIGN PATENT DOCUMENTS

WO    WO 00/62223    10/2000

(Continued)

OTHER PUBLICATIONS

Specification, drawings, and filing receipt of U.S. Appl. No. 09/820,207 filed Mar. 28, 2001, which is assigned to Alexa Internet (a subsidiary of Amazon.com, Inc).

(Continued)

*Primary Examiner*—Andrew Joseph Rudy
(74) *Attorney, Agent, or Firm*—Knobbe Martens Olson & Bear, LLP

(57) ABSTRACT

An electronic marketplace system embodies various inventions for assisting users in listing products for sale, locating the listings for a product, and performing related actions. A user wishing to sell a product can browse to an existing description of the product in an electronic catalog and then select an option to create a corresponding listing. To create the listing for the selected product, the user preferably specifies the product's condition and a selling price. Others may view and make purchases from such listings while browsing the catalog. In one embodiment which is part of a web page metadata service, the World Wide Web serves as the electronic catalog such that users may create, view and make purchases from product listings during viewing of third party web pages that describe the associated products. The system may also provide an option for buyers to preorder products from unspecified sellers.

16 Claims, 20 Drawing Sheets

U.S. PATENT DOCUMENTS

| | | | |
|---|---|---|---|
| 5,551,021 A | 8/1996 | Harada et al. | |
| 5,592,375 A | 1/1997 | Salmon et al. | |
| 5,694,551 A | 12/1997 | Doyle et al. | |
| 5,727,164 A | 3/1998 | Kaye et al. | |
| 5,758,328 A | 5/1998 | Giovannoli | |
| 5,799,284 A | 8/1998 | Bourquin | |
| 5,870,717 A | 2/1999 | Wiecha | |
| 5,895,454 A | 4/1999 | Harrington | |
| 5,970,475 A | 10/1999 | Barnes et al. | |
| 6,023,683 A | 2/2000 | Johnson et al. | |
| 6,038,554 A * | 3/2000 | Vig | 705/400 |
| 6,058,417 A * | 5/2000 | Hess et al. | 709/219 |
| 6,249,772 B1 * | 6/2001 | Walker et al. | 705/26 |
| 6,266,651 B1 | 7/2001 | Woolston | |
| 6,282,548 B1 | 8/2001 | Burner et al. | |
| 6,298,330 B1 | 10/2001 | Gardenswartz et al. | |
| 6,338,047 B1 | 1/2002 | Wallman | |
| 6,405,175 B1 | 6/2002 | Ng | |
| 6,449,599 B1 | 9/2002 | Payne et al. | |
| 6,466,918 B1 | 10/2002 | Spiegel et al. | |
| 6,466,970 B1 * | 10/2002 | Lee et al. | 709/217 |
| 6,473,738 B1 | 10/2002 | Garrett | |
| 6,489,968 B1 | 12/2002 | Ortega et al. | |
| 6,658,390 B1 | 12/2003 | Walker et al. | |
| 6,714,933 B2 | 3/2004 | Musgrove et al. | |
| 6,754,636 B1 | 6/2004 | Walker et al. | |
| 6,850,252 B1 * | 2/2005 | Hoffberg | 715/716 |
| 6,889,250 B2 | 5/2005 | Bezos et al. | |
| 6,917,922 B1 * | 7/2005 | Bezos et al. | 705/27 |
| 6,922,676 B2 | 7/2005 | Alnwick | |
| 7,225,460 B2 * | 5/2007 | Barzilai et al. | 726/1 |
| 7,308,425 B2 * | 12/2007 | Bezos et al. | 705/26 |
| 2002/0032626 A1 | 3/2002 | DeWolf et al. | |
| 2002/0107761 A1 | 8/2002 | Kark et al. | |
| 2004/0230503 A1 | 11/2004 | Lucas | |
| 2005/0010494 A1 | 1/2005 | Mourad et al. | |

FOREIGN PATENT DOCUMENTS

| | | |
|---|---|---|
| WO | WO 00/78557 A1 | 12/2000 |
| WO | WO 01/55936 A1 | 8/2001 |
| WO | WO 01/82107 A1 | 11/2001 |
| WO | WO 03/038560 A3 | 5/2003 |

OTHER PUBLICATIONS

Article titled "Amazon pops into consumer reviews with zBubbles," dated Nov. 17, 1999, printed from news.com.

Barbara Rivera, "*Second Chance//Bell Lady Makes Small Business Venture into Antiques*," Tulsa World; Tulsa Oklahoma, Sep. 17, 1997, two pages.

Susan Gregory Thomas, "*Attention, online shoppers*," New Woman; New York, Sep. 1999, four pages.

Michael Johnson, "*Does it pay to be a first mover in e.commerce? The case of Amazon.com*," Management Decision; London, 2000, nine pages.

Business Wire "*Half.com Unveiled, Transforms Person-to-Person E-commerce; New online marketplace launches with more than one million books, CDs, movies and video games listed*," dated Jan. 19, 2000.

M. Woodall, "*Launch Week a 'Whirlwind' for Half.com*," The Philadelphia Inquirer, dated Jan. 24, 2000.

M. Slatalla, "*Online Shopper; Virtual Garaga Sales, With No Haggling*," The New York Times, dated Apr. 6, 2000.

D. Plotnikoff, "*Navigation tools help the Web traveler*," San Jose Mercury News Center, posted Feb. 5, 2000.

M, Röscheisen, C. Mogensen and T. Winograd, "*Beyond browsing: shared comments, SOAPs, trails, and on-line communities*," Computer Networks and ISDN Systems, pp. 739-749 (1995).

* cited by examiner

*330*

STORE.COM

○————————————|
CONDITION    PRICE    CONFIRM

Please verify that this is the exact item you want to sell.
If this isn't the exact item you want to sell, please enter your ISBN, UPC, or ASIN.

You are selling:

| PHOTO | Olympus Camedia D-150 Digital Camera Value Package<br>Shipping weight: 2.85 pounds<br>ASIN: B00005N7YX |

List your item in 60 seconds. Details
Listing is free——here's what we need:

1. The condition of your item
   You can add a few words to describe your item.

2. Your selling price
   You'll also receive a credit to help cover shipping

3. Credit card, billing address, and phone (we only need this the first time)
   Your buyer will pay online. This lets us authorize you to receive funds.

4. Finally, have a check handy (we only need this the first time)
   Your check number will tell us where to deposit your earnings. When your item sells, we deduct fees, add a shipping credit and transfer your money to you.

What's the condition of your item?
Please choose from the dropdown menu below. You may select "Refurbished" if your item has been rebuilt and is covered by a manufacturer or remanufacturer's warranty. Review our condition guidelines.

Condition: [Select one: ▼] —*345*
Refurbished
Used - Like New
Used - Very Good
Used - Good
Used - Acceptable (Continue) —*350*

Are you a volume seller? Find out how to list and maintain hundreds of items -- and save money in the process.

STORE.COM

CONDITION —— PRICE —— CONFIRM

You are selling:

| PHOTO | Olympus Camedia D-150 Digital Camera Value Package<br>Shipping weight: 2.85 pounds<br>ASIN: B00005N7YX |

Add your comments
Please add a short comment to better describe the condition of your item.

> I got this as a gift 3 months ago  —352

(70 character limit) Example: Dust cover missing. Some scratches on the front

---

Enter the price for your used item
When your item sells, Store.com takes a commission of $.99 plus 15% of your sales price, deposits the rest in your account, and gives you the address of your buyer. To help with shipping, we give you an additional shipping credit.

Store.com price: $379.99

Maximum allowable price: $379.99 (Used items cannot exceed the Store.com price)

Recommended price: $265.99 (Based on the condition you indicated)

Average sales price for this item: $299.00 (Based on past purchases)

Average price of pending Pre-orders: $266.57 (Based on the condition you indicated)

Enter your price: $ [290]  —354   U.S. Dollars

---

Location
Please enter a valid U.S. ZIP Code from which your item will be shipped. Example: 02128

[92660] —356

---

Select your shipping methods
Please click the box below if you offer expedited shipping for the item you're selling. If you offer it, the buyer will be asked to select one of the shipping options. We calculate the shipping costs based on the item's weight. Details Standard Shipping: Required ($6.91 shipping credit, should be delivered in 4-14 business days)

Expedited Shipping: ☑ ($9.57 shipping credit, should be delivered in 3-6 business days)

ITEMS FOR RESALE

| ITEM | CONDITION AND SUGGESTED PRICING | | YOUR PRICE | COMMENTS |
|---|---|---|---|---|
| THE HUNT FOR RED OCTOBER (HARDCOVER) | ☐ LIKE NEW<br>☐ VERY GOOD<br>☐ GOOD<br>☐ ACCEPTABLE | $20.00<br>$18.00<br>$15.00<br>$10.00 | | |
| TRAIN: DROPS OF JUPITER (AUDIO CD) | ☐ LIKE NEW<br>☐ VERY GOOD<br>☐ GOOD<br>☐ ACCEPTABLE | $12.00<br>$11.00<br>$9.00<br>$7.00 | | |

Submit For Resale

FIG. 4B

METADATA SERVICE THAT SUPPORTS USER-TO-USER SALES VIA THIRD PARTY WEB PAGES

RELATED APPLICATIONS

The present application claims priority benefit under 35 U.S.C. §119(e) of U.S. Provisional Application No. 60/336,409, filed Oct. 31, 2001, and U.S. Provisional Application No. 60/351,207, filed Jan. 22, 2002, the disclosures of which are hereby incorporated by reference.

FIELD OF THE INVENTION

The present invention relates to electronic marketplaces through which users buy and sell items over a computer network. More specifically, the invention relates to user interfaces and methods through which users may place items for sale, locate items offered by others, and perform related actions within an electronic marketplace.

BACKGROUND OF THE INVENTION

As the popularity and accessibility of computer networks continue to increase, it has become common for retail merchants to set up online "stores" for marketing and selling products. Typically, an online store includes a web-based or other electronic catalog of products that are available for purchase. Users browse the catalog using well known navigational tools to locate and purchase products of interest.

Electronic systems that support user-to-user sales of products have also become popular. These user-to-user sales systems typically include an electronic server system, such as a web site or an online services network, that provides services for users to list products for sale to, and purchase products from, other users. Sellers in such systems typically include both small merchants and non-merchant individuals. Existing user-to-user sales systems typically support fixed-price sales, auctions, or both. Product listings can typically be located using a search engine. In some cases, the user-to-user sales system is operated in association with an online retail store such that a customer can search a retail catalog, as well as a database of product listings from users, via a single search query.

User-to-user sales systems have the potential to attract large numbers of users, thereby potentially generating large and varied product listings of both new and used products. However, such systems commonly suffer from a number of deficiencies. For example, existing systems typically rely on sellers to supply descriptions of the products they are selling. The task of creating marketplace listings can therefore be cumbersome—particularly for small sellers. For example, to create an effective listing, the seller typically must obtain and upload a detailed product description and image.

In addition, different sellers in an online marketplace will often use very different terminology to describe identical products. As a result, buyers seeking certain products often fail to find relevant listings, and sometimes become overwhelmed in less-relevant listings. Further, small sellers sometimes fail to fully and accurately describe their products, resulting in lost sales and/or erroneous purchases. Further, unlike the retail listings in some online stores, marketplace listings typically do not include customer ratings, customer and professional reviews, sales rank data, and other types of product-related data provided by sources other than the sellers.

Some user-to-user sales systems seek to address the above problems by allowing a seller to specify a UPC (Universal Product Code) or other product identifier of a product being listed. This allows the system to associate all of the seller listings for a particular product. Typically, however, the seller must know or look up the correct product identifier in order to create such a listing.

Embodiments of the disclosed inventions seek to overcome some or all of the above and other problems.

SUMMARY OF THE INVENTIONS

Various inventions are disclosed for facilitating user-to-user and other sales in an online marketplace, including features for assisting users in efficiently creating and locating marketplace listings. These features may be embodied individually or in an appropriate combination within a particular system.

In a preferred embodiment, the online marketplace system includes a database of information about products that may be listed by users within an online marketplace. This information typically includes product IDs, and descriptions and product images provided by manufacturers or distributors of the products. The product information in this database is viewable by end users through a browsable electronic catalog in which each product is preferably fully identified within a corresponding product detail page. Each product detail page typically includes a product image and description, and may include customer ratings, customer and professional reviews, sales rank data, lists of related products, and/or other types of supplemental data that may assist consumers in making informed purchase decisions. This supplemental data may be maintained or generated by the operator of the marketplace system as a service to its customers. Users of the system can preferably locate specific product detail pages within the catalog by executing search queries, navigating a browse tree, or using any other navigation method supported by the particular system.

To add a listing for selling a particular product within the marketplace, a seller may browse to the detail page for that product and then select a link for adding a listing. Because the seller fully identifies the product to be listed by browsing to the corresponding detail page, the listing may be accurately associated with a particular product ID (UPC, ISBN, etc.) without the need for the seller to supply the product ID.

In addition, because detailed information already exists within the database for that product, there is no need for the seller to supply a complete description of the item. For example, in one embodiment, the seller can simply specify the condition and selling price of the particular unit of the product. Because the seller need not supply a detailed product description, listings may be added more rapidly and efficiently. The newly added product listing (referred to generally as a "marketplace listing" or "marketplace product listing") may, for example, be in the form of a fixed-price listing or an auction listing.

To assist potential buyers in efficiently locating the marketplace listings for a particular product, each product detail page preferably displays or summarizes the existing marketplace listings for the corresponding product. These listings may be associated with a variety of different sellers (including individuals and small merchants), and may be for both new and used units of the product. Thus, by accessing the detail page for a particular product, a buyer can efficiently and accurately locate all of the current marketplace listings (if any) for that product, as well as view detailed product information from the product database (typically including product images, third party product reviews, etc). The user can also preferably compare the prices, product conditions, and other parameters of the various listings, and can initiate purchasing of the product from a particular seller.

Because each marketplace listing is displayed in conjunction with the corresponding product's description within the database/catalog, there is a significantly reduced need for buyers to rely on the accuracy and completeness of product information supplied by the seller. Thus, the risk of buyers misidentifying the listed products (e.g., buying product A with the belief that it is product B), or of being unable to determine the identity or characteristics of a listed product, is significantly reduced.

In one embodiment, some or all of the detail pages may also provide an option to purchase the product from a preferred retailer or "provider seller," which may be the operator of the marketplace system or a business partner of the operator. The system may thus serve as both an online store and an online marketplace, with the marketplace sellers being permitted to list their items for sale on the product detail pages or other catalog "real estate" of the store. This feature provides a cross-selling benefit by effectively driving retail customers to non-retail listings and vice versa. Further, because catalogs used by online stores tend to have detailed and accurate product descriptions of consistent format, the task of evaluating marketplace listings is made easier for buyers.

A detail page may also be configured to display any existing marketplace listings for products that are similar or related to the product featured in the product detail page. For instance, a detail page for a particular laptop computer may, in addition to displaying any existing marketplace listings for the laptop computer itself, display any listings that exist for (a) accessories for the laptop computer, and/or (b) similar laptop computers. A table of similar or related products may be used to implement this feature.

When a particular product is currently unavailable within the online marketplace, the product's detail page may provide an option for buyers to pre-order the corresponding product from an unspecified marketplace seller. These preorder requests may be displayed within the corresponding product detail pages to entice possessors of such products to list the same within the marketplace. In one embodiment, the creator of a preorder listing is prompted to specify a minimum product condition desired and a maximum price to be paid. These parameters are preferably used by the system to automatically match preorder listings with suitable marketplace listings.

To accommodate volume sellers, the marketplace system may also provide a bulk uploading service that permits sellers to add multiple listings at a time without first browsing to the associated product detail pages. When a bulk-uploaded listing record does not specify a standard-format product ID, the bulk uploading service preferably executes a search routine to attempt to match the listing record to a corresponding product record of a product represented in the electronic catalog. When such a match is found, the listing record may be associated with the corresponding product ID, and the resulting record displayed on the product's detail page. When no match is found, the system may, in one embodiment, create a non-catalog-based product listing that is displayed separately from the products catalog.

The various pages of the electronic catalog may be in the form of web pages, display screens of an online services network or interactive television system, or any other type of suitable electronic display. Although the marketplace system preferably employs product detail pages, the above and other features may be implemented without the use of product detail pages. For instance, the electronic catalog may list multiple products per page without an option to drill down to product detail pages. In such cases, the option to add a listing for a product, the existing listings for that product, and/or the option to preorder the product, may simply be displayed in conjunction with the corresponding product description on the multi-product page.

Another feature, which may be implemented alone or in combination with the features set forth above, involves providing an option for users to add marketplace listings from their respective purchase histories. In a preferred embodiment, the marketplace system maintains a purchase history for each buyer within the system. The purchase histories may reflect purchases made from a variety of different sellers (including both merchants and non-merchants), and may include gift purchases made by others for the subject user. To add a marketplace listing in one embodiment, a user may browse his or her purchase history and select one or more items therefrom to sell within the marketplace. Because each product is accurately identified by virtue of its selection from the purchase history, the listing may be accurately associated with a particular product ID or product record within a product database (as with listings created from product detail pages). In addition, because a preexisting description of the product preferably exists within the database/catalog, there is no need for the seller to supply a detailed product description. The seller may be able to list a product to sale by merely specifying a selling price and the product's condition.

To further facilitate the ability for users to add marketplace listings from their respective purchase histories, the marketplace system may proactively remind users of their prior purchases and of the option to re-sell the purchased items. For instance, at a particular point in time after a user purchases an item from the marketplace (or from a retail catalog), the system may send an email message or a custom page to the user describing the item and providing a link for selling the item. In some embodiments, selection of the link may cause the item to be listed immediately (without further action by the user).

In some cases, transmission of these reminder or "listing request" messages may be triggered by specific user actions, such as the purchase by the user of a superceding product, or submission by the user of a review or rating for the product. In addition, listing requests may be generated in response to the existence of preorder requests; for example, when the number of preorder requests for an item exceeds a particular threshold, the system may identify and send email-based listing requests to users who recently purchased that item.

Another feature is a service for suggesting prices to creators of marketplace and/or preorder listings. In one embodiment, when a user initiates creation of a marketplace listing for a particular product (e.g., from a product detail or a purchase history, as described above), the system may suggest a selling price to the user. This price may be based on one or more of the following, as well as other, criteria: (1) the current retail price for the product in an associated online store, (2) the manufacturer's suggested retail price, (3) the condition and/or age of the product (as specified by the user, or as predicted or determined from the user's purchase history in the case of a re-sell item), (4) prices paid by other marketplace users for the same or similar products of like condition, (5) prices at which the product is currently available from other marketplace sellers; (6) prices specified in any pending preorder requests for the item, (7) the current demand for the product as evidenced by preorder requests. The same or similar criteria may also be used to suggest a maximum purchase price to the creator of a preorder listing.

As will be recognized, some of the foregoing features may be implemented in a particular system without others without departing from the scope of the invention. By way of example and not limitation, one or more of the foregoing methods for creating product listings may be implemented without others, and/or without the ability to preorder products from marketplace sellers.

Further, some or all of the features may be embodied within a metadata service in which a metadata server provides web page metadata to a metadata client for display to users. In such an embodiment, the entire World Wide Web, or a selected subset of the World Wide Web, may be used as the products catalog. For instance, when a user views a web page that, based on an analysis of web page content performed by the metadata service, displays a description of a first product, the service may present to the user an option to sell a unit of the first product. If the user selects this option and creates a product or preorder listing, the service may thereafter display this product or preorder listing to other service users when such users access the same web page or any other web page that includes a description of the first product.

BRIEF DESCRIPTION OF THE DRAWINGS

A system that implements the foregoing and other features will now be described with reference to the drawings. The drawings and the associated descriptions are provided to illustrate specific embodiments and features of the inventions and not to limit the scope of the inventions. Throughout the drawings, reference numbers are re-used to indicate correspondence between referenced elements. In addition, the first digit of each reference number indicates the figure in which the element first appears.

FIGS. 3C-3E illustrate an example sequence of pages for creating a marketplace product listing once a product has been selected.

FIG. 4B illustrates an example resale page corresponding to the product selections shown in FIG. 4A.

DETAILED DESCRIPTION OF PREFERRED EMBODIMENTS

Figure 1A:
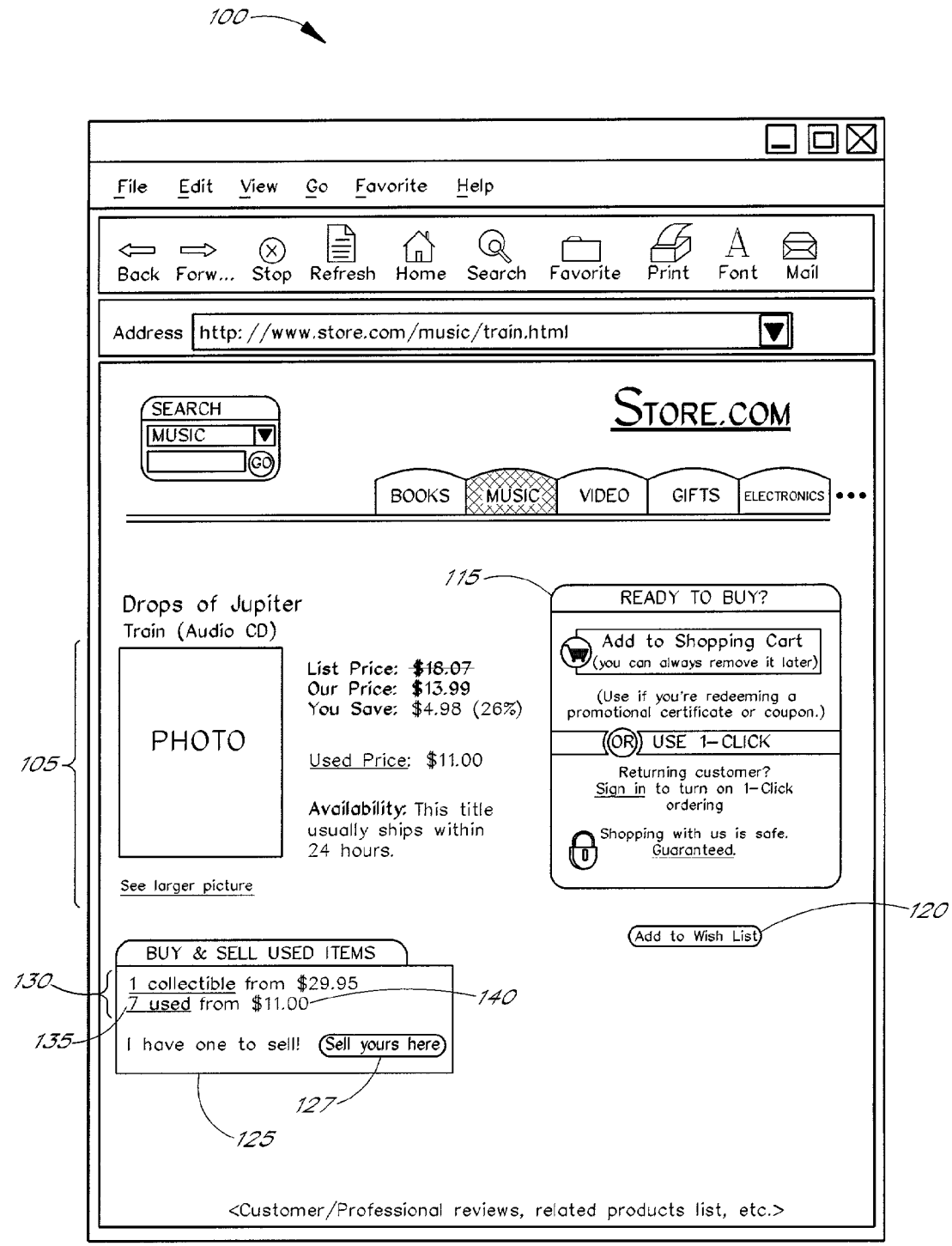
FIG. 1A illustrates an exemplary product detail page showing marketplace product listings, and an option to create a marketplace listing, according to one embodiment.

An online marketplace system which embodies the above and other inventive features will now be described in detail. As will be apparent, many of the disclosed features may be used without others, and may be implemented differently than described herein and/or in combination with features not disclosed herein. Although described primarily in the context of a web site system, the various inventive features are also applicable to other types of multi-user interactive systems in which users may browse and make purchases from an electronic catalog, including but not limited to online services networks, interactive television systems, in-store kiosk systems, and systems that support browsing by voice. The following description is thus intended to illustrate, and not limit, the invention.

Throughout the description, the term "marketplace" is used to refer generally to an electronic forum through which users may buy and sell products using a preexisting electronic catalog of products. The term "marketplace listing," or "marketplace product listing" refers generally to an electronic listing for selling a product (and typically a specific product unit) within a marketplace. In a preferred embodiment, marketplace listings are associated with particular product records in a products database, and are displayed in the product catalog in association with corresponding product descriptions.

The term "marketplace system," or merely "system," is used to refer generally to the underlying computer hardware, software and data components that provide the marketplace. In one embodiment, the marketplace system also provides services for users to (1) use the product catalog to make retail purchases from a preferred seller, and (2) buy and sell items in an area in which sellers' product listings are not associated with specific product records or displayed within the electronic catalog (referred to as "non-catalog-based" listings or "non-marketplace" listings).

The term "product" may, depending on its context, refer to either (a) a particular unit or copy of a product, or (b) any unit or copy of that product. The term "unit" is used in some instances to emphasize that a particular unit or copy of a product is involved.

The term "user" refers generally to an individual, or a set of individuals, associated with a particular user account. In some contexts, the term may also refer to an individual who has not yet set up an account.

I. Overview

According to one embodiment of the invention, the marketplace system includes various computer-implemented services through which sellers can list products for sale in a preexisting electronic catalog, and buyers can browse the catalog to purchase and preorder items from marketplace sellers. As described below, the catalog also provides an option to purchase retail versions of some or all of the products from a preferred retailer. The electronic catalog is preferably controlled or administered by a single business entity, referred to herein as the "marketplace operator" or "marketplace provider."

The products represented in the catalog are typically physical products that are shipped to the buyer, such as books, CDs, DVDs, electronic devices, and toys. In some embodiments, the products may also include digital products downloaded or transmitted to a buyer's computing device, such as music files, viewable content, or software programs. Other examples of the types of products that may be included in the catalog include tickets for travel or events, cars, and movie titles. In some embodiments, the purchases need not involve an actual transfer of ownership, but may involve leases, licenses, rentals, subscriptions, and other types of business transactions.

The electronic catalog is preferably accessible over the Internet or other network using an ordinary web browser. Some or all of the products represented in the electronic catalog are products that may be listed for sale within the marketplace by users of the system. Preferably, the electronic catalog includes representations of many millions of products, including products falling in many different product categories, to facilitate the ability for users to list the products they wish to sell. The catalog content preferably includes "static" product descriptions and images provided by their manufacturers, distributors, and/or another appropriate source. This content is preferably stored in a database used to dynamically generate the catalog pages, but may alternatively be contained within the HTML or other coding of such pages.

The electronic catalog can be navigated through a number of conventional mechanisms. For example, users may browse a hierarchy of product categories and associated products, often referred to as a browse tree. Moreover, users may enter search terms into a search engine and obtain search results. In any event, users may navigate the electronic catalog to locate information on one or more products of interest.

As is common in some online store systems, detailed information about a product can be obtained by navigating to the product's detail page within the catalog. Each detail page may include, for example, a product name, a unique product ID, a specification or other description of the product (including manufacturer, brand, author, artist, etc., as applicable), a picture or multimedia presentation of the product, reviews of the product (e.g., from customers and/or professional reviewers), average customer ratings, a listing of similar or related products, pricing and availability information, shipping information, and/or sales rank data maintained by the system. Two or more different versions or views of the same product detail page may be presented within the electronic catalog (see, e.g., FIGS. 1A and 1B), and these views may be customized or personalized for the viewer of the page. Some or all of the product information displayed in a detail page is preferably "static" information (e.g., provided by the product's manufacturer or distributor) that does not change over time (except under the control of the marketplace operator) as marketplace listings are added and removed. As described below, each detail page also preferably lists or summarizes the existing marketplace listings for the product on that page (and optionally for related or similar products), and provides an option for a user to add a marketplace listing for that product.

Each particular product detail page typically provides an option to purchase the displayed product from one or more sellers. For example, a detail page may provide an option to purchase the product from a preferred retailer or "provider seller," which may be either a provider/operator of the marketplace system or a business partner thereof. Typically, each provider seller is a well known retail merchant. (The name "Store.com" is used in the screen displays to represent a hypothetical provider seller.) Two or more different provider sellers may sell products via the system, with each assigned to a different respective product category or set of categories (e.g., books versus toys versus electronics). Alternatively, the different provider sellers may be periodically rotated on a particular product category or set of categories based on criteria negotiated with the marketplace operator. In some embodiments, the catalog does not provide an option to purchase products from a provider seller (e.g., the system may only support user-to-user sales).

A detail page may also include one or more marketplace listings created by end users of the system (generally "marketplace sellers"). The marketplace sellers typically include individual users and small merchants, and in some implementations, may also include large merchants (including retailers) that are not provider sellers. The marketplace listings may be for used or preowned products, retail or other new products, and/or other types of products such as collectibles. In some implementations, and/or for certain products or product categories, the system may only support marketplace listings of used product units.

Typically, each marketplace listing is for a particular unit of a product, and is removed from the detail page once that unit is purchased. Persistent listings used to sell an inventory of product units may also be supported; for example, the system may support the ability for a marketplace seller to request that the listing remain in place until a specified number of units have been sold.

As is conventional, users of the marketplace system can register online as marketplace sellers and thereafter create marketplace listings. As part of seller registration and/or as marketplace listings are created, the system may allow the user/seller to specify shipping and other policies to be published to buyers, and specify a bank account into which proceeds from sales are to be deposited by the system or its operator. An example process by which users may efficiently create links to their bank accounts is described in U.S. patent application Ser. No. 09/517,563, filed Mar. 2, 2000, the disclosure of which is hereby incorporated by reference.

The system may also support the ability for users to add product "preorder" listings, such as when a desired product is currently unavailable within the marketplace. For example, a buyer may add a preorder listing to a product detail page specifying that the buyer wishes to purchase a next available used product unit available from a marketplace seller for a designated price (see FIGS. 2 and 3A, discussed below). Preorder listings advantageously entice possessors of a product to sell that product. The preorder listings may also be used by a provider seller to gauge the level of current demand for a given product, as may be desirable for purposes of inventory management. As with marketplace listings, users can preferably initiate creation of preorder listings from corresponding product detail pages. As discussed below, the system may automatically match preorder listings over time with suitable marketplace listings.

Once registered with the marketplace system, a marketplace seller may add a marketplace listing for a particular product from the catalog description, and preferably from the product detail page, for that product. For example, when a seller wishes to sell a book he or she is finished with, according to one embodiment, the seller may access the product detail page associated with the book, and as discussed in detail below, add a marketplace listing to the product detail page. Thus, once a user becomes familiar with the navigation tools and methods that exist for browsing the catalog (e.g., as the result of making purchases), the user can use the same tools and methods to locate/specify a product to be sold. An important benefit of this method for adding marketplace listings is that the seller need not supply a description of the product (although the marketplace seller may nevertheless be permitted to supply descriptive content). For instance, in one embodiment, a seller may create a marketplace listing from a product detail page by merely specifying a selling price and the product's condition, without more. Another benefit is that sellers need not supply UPCs, ISBNs, or other standard product identifiers for the products they wish to list within the marketplace.

As described below, users may also be permitted to add marketplace listings from their respective purchase histories, without browsing to the associated product descriptions in the catalog. For instance, a user who previously bought an electronics device (from a marketplace seller or a provider seller) using the system may select that item from a listing of his or her purchase history, and then simply specify a price and product condition for re-selling the item within the marketplace (see FIGS. 4A and 4B). To enable this feature, the marketplace system maintains user purchase histories that reflect the purchases made by each user of the system. A user's purchase history may also include purchases by others of gifts for that user, including but not limited to purchases made from a wish list for the user.

An important benefit of the above-described methods for adding marketplace and preorder listings is that each such listing may be stored by the marketplace system in association with a corresponding product ID or product record within a product database. As a result, the marketplace system can accurately identify and display all marketplace (and/or preorder) listings associated with a particular product. Thus, the likelihood that buyers will fail to locate relevant listings is significantly reduced.

Significant benefits may also be achieved by displaying the current marketplace and/or preorder listings in association with catalog content (product descriptions) obtained from sources other than the marketplace sellers themselves. (As used herein, the term "catalog content" refers generally to product descriptions and data obtained from sources other than the marketplace sellers of the associated products—such as manufacturers, publishers, distributors, professional reviewers, the provider/operator of the system, etc.) For example, for marketplace listings, because buyers can identify the listed products from such catalog content, without the need to rely on the accuracy of descriptions supplied by the marketplace sellers, there is a reduced likelihood that buyers will misidentify, or be unable to identify, the listed products. Further, in embodiments in which the catalog content includes professional reviews, customer reviews, average customer ratings, and/or other types of supplemental information not commonly found in auction and other user-to-user sales listings, potential buyers can efficiently make informed purchase decisions of products listed in the marketplace.

The foregoing association of product listings to individual product detail pages is preferably accomplished through the use of product IDs. The product IDs can include Uniform Product Codes (UPCs), ISBNs, and other types of standard product codes. For purposes of uniformity, even if a product already has a standardized ID (ISBN, UPC, etc.) associated with it, each product in the catalog is preferably assigned a store standard ID referred to herein as an "ASIN." For other products that lack a standardized ID, the operator of the marketplace system may generate and assign ASINs.

According to one embodiment, the online marketplace system uses ASINs as an index to relate or otherwise associate information in various databases with each other to, for example, build product detail pages. In a preferred embodiment, the online marketplace system can use an ASIN to retrieve a product's catalog content, and any associated marketplace/preorder/provider listings, and build product detail pages such as those described below with reference to FIGS. 1 and 2.

According to another aspect of the invention, the online marketplace system may use the purchase histories of users, and/or other evidence of product ownership, to proactively generate requests to such users to list their items within the marketplace. Such "listing requests" may be sent by email, a custom web page, or otherwise, and may support the above-mentioned "low friction" method for adding a marketplace listing (e.g., specify condition and selling price, without more). According to one embodiment, the timing of such a request may depend on the type of product purchased. For example, for a short novel, the request may be sent a few weeks after the purchase, while a longer time interval may be used for longer book titles.

The proactive requests may also be sent as the result of changes in demand for a particular product as developed, for example, through the foregoing preordering process. For example, when one or more preorder requests exist for a particular product, an executable task of the marketplace system may search the purchase histories of users to identify one or more recent purchasers of that product, and then send a listing request to each such purchaser. The listing request may include a suitable message such as the following: "As a recent purchaser of <item name>, we thought you might like to know that <# of preorders> buyers are currently waiting to purchase this item used; if you would like to sell this item within the store.com marketplace, click here."

Additionally, a particular action by a user may cause a listing request to be sent to that user; for example, a request to list a particular book title may be presented to a user when or shortly after that user (1) submits a review or rating for the book, or (2) purchases the book's sequel. Where the action by the user evidences ownership (e.g., submission of a product review), the listing request may be presented regardless of whether that product is included in the user's purchase history.

When a user attempts to add a marketplace or preorder listing by one of the foregoing methods, the user's identity may be determined using cookies, a login procedure, a session ID (e.g., if the user has already logged in), or any other suitable method. If the user has not yet registered as a seller, the user may be prompted to do so.

In accordance with another aspect of the invention, the online marketplace system may provide a service for suggesting a suitable selling or asking price to the creator of a marketplace or preorder listing, respectively. For example, the system may use one or more of the following criteria to suggest a selling price to a user who is creating a marketplace listing: the current retail price for the product, the manufacture's suggested retail price, the condition and/or age of the product (as specified by the user, or predicted from the user's purchase history in the case of a re-sell item), prices paid by other marketplace users for the same or similar products of like condition. In one embodiment, the user is free to use or ignore the suggested price. In embodiments in which auctions are supported, a seller may use the suggested price to (1) select a minimum price at which bids are to be accepted, and/or (2) select a "buy it now" price at which a buyer can immediately purchase the item. As described below, marketplace system's user interface may support the ability for a user to create a marketplace listing (including specifying the selling price and condition), from a product detail page or a purchase history listing, with a single mouse click or other single selection action.

When a marketplace listing is created from a user's purchase history, the system may also use data associated with the user's prior purchase of the item to assist the user in creating the listing. By way of specific example, a user may purchase a used marketplace item listed as being in "good" condition for $25, and two weeks later, may select that item from his purchase history to create a marketplace listing. In such a scenario, the system may use "price=$25" and "condition=good" as default parameters for reselling the item. The user may accept these default parameters (e.g., by selecting a single-action link for creating the listing) or specify new parameters.

The marketplace system may also provide a bulk uploading service for allowing volume marketplace sellers, such as large merchants, to include their inventories in the listings of the online marketplace without having to browse to the associated product descriptions in the catalog. According to one embodiment, the bulk uploading service is implemented by a loader component that allows a volume seller to upload multiple listings to the marketplace system at one time from the volume seller's database. Typically, these listings include detailed product descriptions and images, and are uploaded using a standard or uniform format published to volume sellers.

The loader preferably analyzes each such listing, and attempts to match the listing to a product represented within a product database of the marketplace system, thereby associating the listing with an existing product detail page of the existing catalog. Each bulk-uploaded listing is added to the existing product detail page for the associated product. If the loader determines that a bulk-uploaded listing is for a product not currently represented in the product database (and thus not included in the catalog), the loader preferably uses the uploaded product description to generate a new database record and product detail page for the product. The marketplace operator can then review the newly generated product database record to determine the sufficiency of the information that is provided and whether the record should be added to the electronic catalog. The number of products represented in the electronic catalog may therefore grow under control of the marketplace operator over time as the result of bulk uploading activities of volume sellers.

In some embodiments, such as those directed primarily to person-to-person sales, the capability to perform bulk uploads may be omitted.

As mentioned above, the system may also provide a service for allowing sellers to list products for sale without associating the listings with specific products in the electronic catalog. These "non-catalog-based" or "non-marketplace" listings are not displayed on product detail pages, but may be located by potential buyers using a search engine or other navigation tool. By supporting such non-catalog-based listings, the system accommodates sellers who wish to sell items that are not currently represented in the catalog at the same time that they sell items represented in the catalog.

II. Example Web Pages

Example pages and page flows illustrating specific web-based implementations of the above-described features will now be described with reference to FIGS. 1A-4B. Associated web site components and process flows are illustrated in FIGS. 5-10 and are described separately below. Although the example pages depict fixed-price sales, it will be recognized that the illustrated features may also be used for auction listings.

A. Example Product Detail Pages

FIGS. 1A, 1B, 2, and 3B illustrate some of the types of information and options that may be presented within product detail pages in accordance with one embodiment of the invention. Some types of catalog content mentioned above (customer and professional reviews, etc.) are omitted from these figures to simplify the drawings. The example pages represent an implementation in which products may be purchased from both provider sellers and marketplace sellers, and in which the marketplace listings are for fixed price sales. As mentioned above, the option to make purchases from provider sellers may be omitted in some embodiments. In addition, in some implementations, some or all of the marketplace listings may be in the form of auction listings.

As shown in FIG. 1A, each product detail page 100 includes product information 105 (one type of catalog content) and one or more boxes or "tags." A provider tag 115 comprises various user activity buttons 120 relating to purchasing the displayed product from a provider seller. In the FIG. 1 example, the provider tag 115 allows a user to immediately purchase the product (a music CD in this example) from the provider seller; or add the product to a personal shopping cart for subsequent purchase. The page also includes a button 120 for adding the product to a personal wish list. Other buttons (not shown) may be included for, for example, allowing users to submit customer ratings and reviews of the product.

The product detail page 100 in this example also includes a marketplace tag 125. The marketplace tag 125 comprises information related to the existing marketplace listings for the product, if any. As shown in FIG. 1A, the tag 125 specifies the types of the marketplace listings 130 ("collectible" and "used" in this example), the quantity 135 of listings of each of such type, and one or more of the associated prices 140 (the lowest price of all available used items in this example). Other types of marketplace listings such as "Refurbished," "New," "Retail," and "Auction" may be supported. In some implementations (and/or for certain products), the system may only permit marketplace listings for used products.

Although the marketplace tag 125 displays a marketplace listing summary in this example, additional details may be displayed in the tag 125 or elsewhere in the product detail page 100. The marketplace tag may also list or summarize any existing preorder listings for the product (see FIG. 3B, discussed below). In addition, the marketplace tag 125 may display a button for creating a preorder listing for the product (see "pre-order item" button in FIG. 2).

When a buyer wishes to purchase the product from the provider seller, the buyer may do so by selecting an appropriate button or link located in the provider tag 115. Alternatively, when the buyer compares the price associated with the provider listing with the price indication 140 for various types of marketplace listings, the buyer may be motivated to select one of the marketplace listings. The buyer selects which marketplace listing to view by clicking on the corresponding hypertext link in the marketplace listing ("collectible" or "used" in the present example). Clicking on the marketplace listing takes the buyer to a marketplace listing detail page as described in detail below.

The marketplace tag 125 also includes a "sell yours here" button 127 for allowing a user to create a marketplace listing for the product. Upon selection of this button in one embodiment, the user is prompted via one or more separate pages to specify the product's condition and a selling price (see FIGS.

Figure 6:
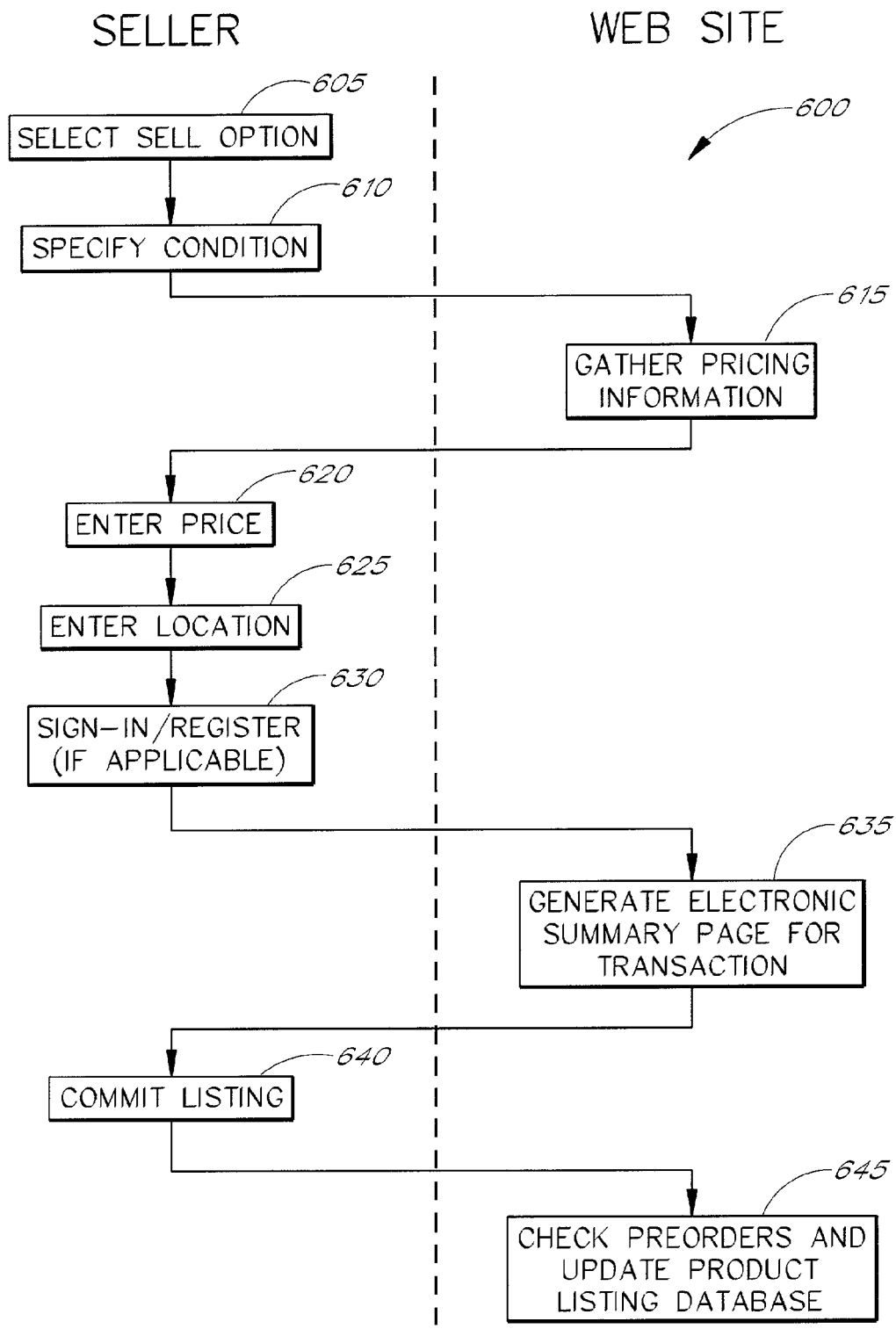
FIG. 6 illustrates one method by which a seller may create a marketplace listing.

3C and 3D, discussed below). Fields, drop down menus, and/or other display elements may alternatively be included in the product detail page for allowing the user to specify the condition and price, so that the user may create the listing without the need to first access an additional page. The user's identity may be determined using a browser cookie, although in some cases (e.g., where the selling price exceeds a certain threshold), the user may also be prompted to supply a user ID or other authentication information. An example page flow for adding a marketplace listing to a product detail page is shown in FIGS. 3C-3E (described below), and an associated process flow is illustrated in FIG. 6 (also described below).

Figure 1B:
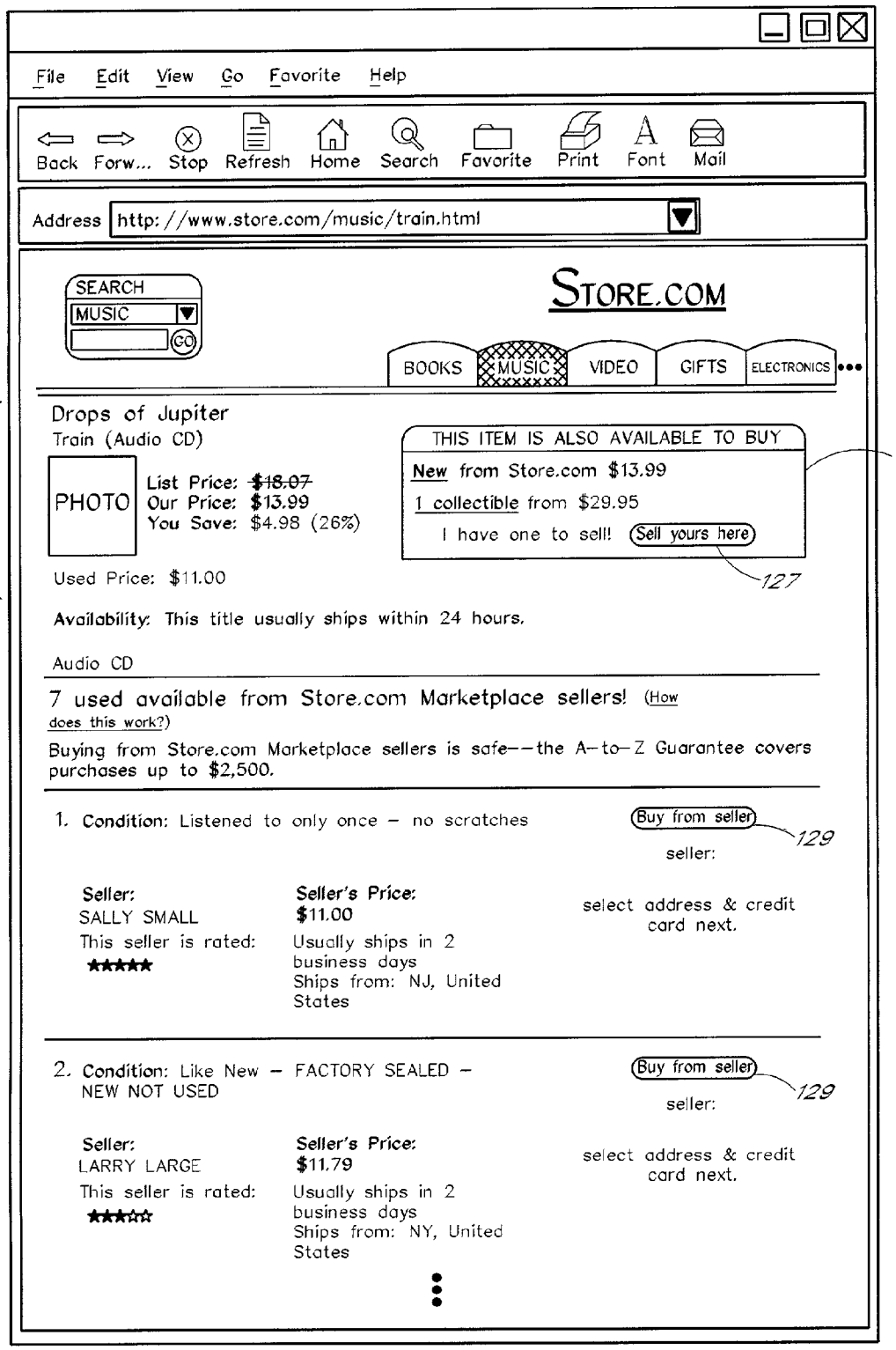
FIG. 1B illustrates another view or version of the product detail page of FIG. 1A, with additional information about marketplace listings for used products.

For each marketplace listing category in which one or more listings exist, the marketplace tag 125 includes a hypertext link to more information related to those listings. In one embodiment, selection of such a link causes the system to effectively supplement the product detail page with detailed information about the subject listings. For example, selection of the "7 used" link in FIG. 1A preferably causes the marketplace system to return a version of the detail page that includes detailed information about each listing falling in the "used" category, as depicted in FIG. 1B (two such listings shown). For each such marketplace listing, the page includes additional details about the listing, such as, for example, the name of the marketplace seller, the seller's average customer rating (based on ratings submitted by prior buyers), the price, the condition of the product, the seller's shipping policy, and a buy button 129 or other link for initiating a purchase (such as adding the product to a shopping cart).

An important aspect of the embodiment depicted in FIGS. 1A and 1B is that the option to sell a unit of an item within the marketplace is displayed in conjunction with (e.g., on the same product detail page as) an option to buy a unit of that item. Thus, users who access the catalog for purposes of making purchases are exposed to the process by which they may list items for sale. As a result of such exposure, users are more likely to become marketplace sellers. Another benefit is that users can use the same catalog search and navigation tools for both buying and selling products.

When a user purchases a product from a marketplace seller by selecting the corresponding buy button 129 to that marketplace listing, the marketplace system typically handles the collections process (e.g., charges the buyer's credit card), and deposits the resulting proceeds (minus a commission) into a bank account of the seller. Other collections methods such as direct payment to the seller may also be supported. The marketplace system also notifies the seller of the sale (e.g., by email or directly through xml data feed in the event of volume sellers) so that the seller may ship the product. The system may also support the ability for the buyer to rate the seller after the transaction is complete, and may publish seller ratings data to potential buyers.

For the convenience of the buyer, an additional tag 150 reiterates the other purchase options that are available to the buyer. In this example, the other options include purchasing the product from the provider seller ("store.com") and purchasing a collectible unit from a marketplace seller. The tag 150 also includes a "sell yours here" button 127 for creating a new marketplace listing, as in FIG. 1A.

Although the above example uses multiple versions or views of a product's detail page, in some embodiments, only a single detail page view may be provided for each product. For example, the details of each marketplace listing may be illustrated on the original product detail page 100. Further, the marketplace listings for a particular product, and the option to create such listings, may be displayed within non-product-detail pages, such as search results pages and browse node pages, that commonly feature or list multiple products per page.

Figure 2:
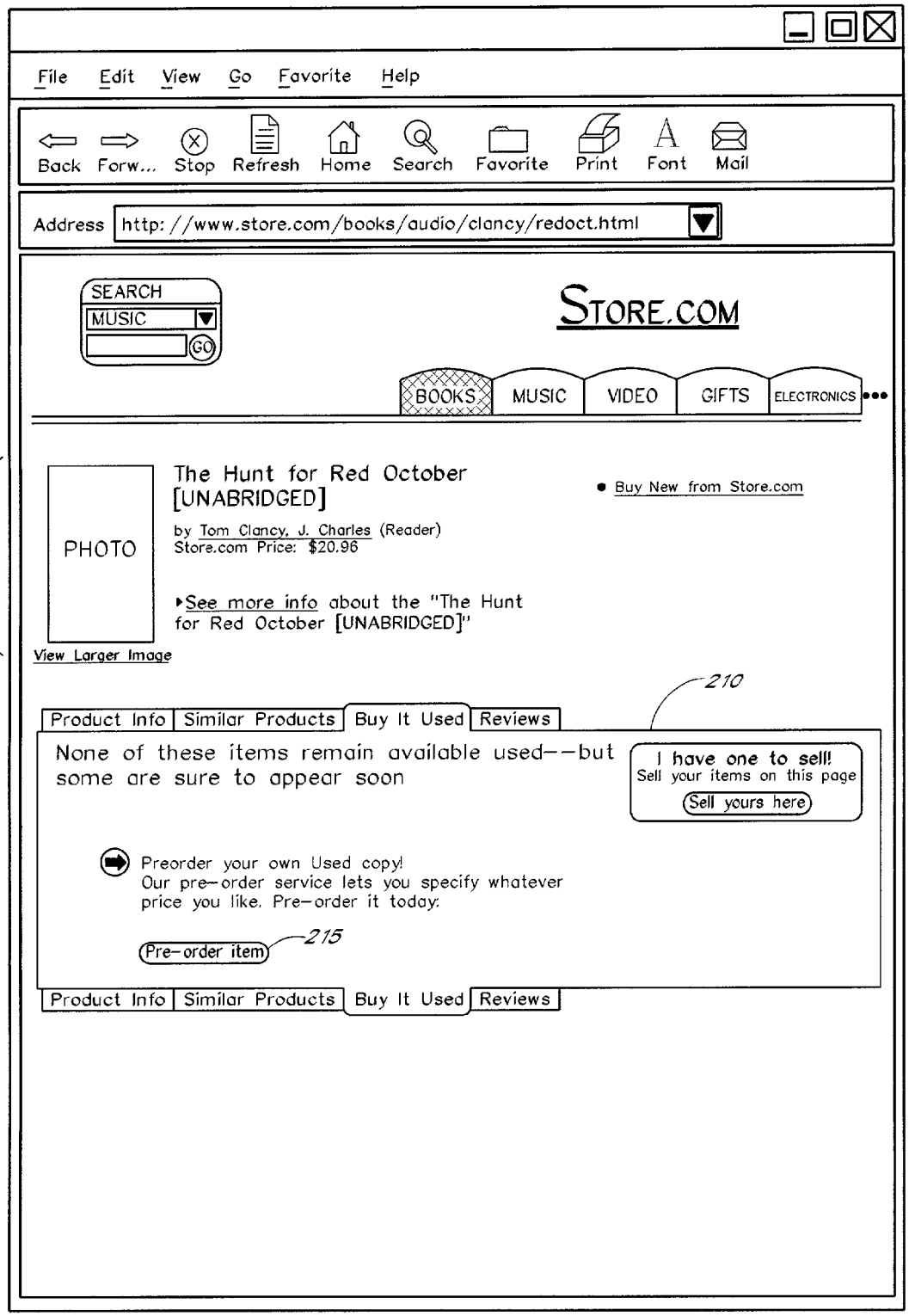
FIG. 2 illustrates a product detail page of a product that is not currently available from a marketplace seller.

FIG. 2 illustrates another product detail page format that may be used throughout the catalog. In this particular example, the page includes a set of tabs 210 that are used to organize various types of information and options. As is known in the art, selection of a tab reveals the information associated with that tab. The tabs in this example include a "Product Information" tab, a "Similar Products" tab, a "Buy it Used" tab 210, and a "Reviews" tab. In the illustrated example, selection of the "Buy it Used" tab 210 reveals that the system currently has no marketplace listings for the book in the "used" category. The page thus provides potential buyers the ability to preorder a used unit of the illustrated product by clicking on the pre-order button 215. Thus, as with marketplace product listings, the process of adding a preorder listing may be initiated from a detail page for the product.

Although product detail pages provide a convenient mechanism for aggregating the foregoing product listings, user options, and other elements of information associated with a particular product, a skilled artisan will recognize from the disclosure herein that the various features described can be implemented without the use of product detail pages. For example, the electronic catalog may list multiple products per page rather than a single product per detail page. In such cases, the option to add a marketplace listing for a product, and the existing marketplace and/or preorder listings for that product, may simply be displayed in connection with the corresponding product description on the multi-product page. Hybrid approaches which use both product detail pages and other types of pages to display marketplace listings and listing-creation options are also possible.

B. Creation and Display of Preorder Listings

Figure 3A:
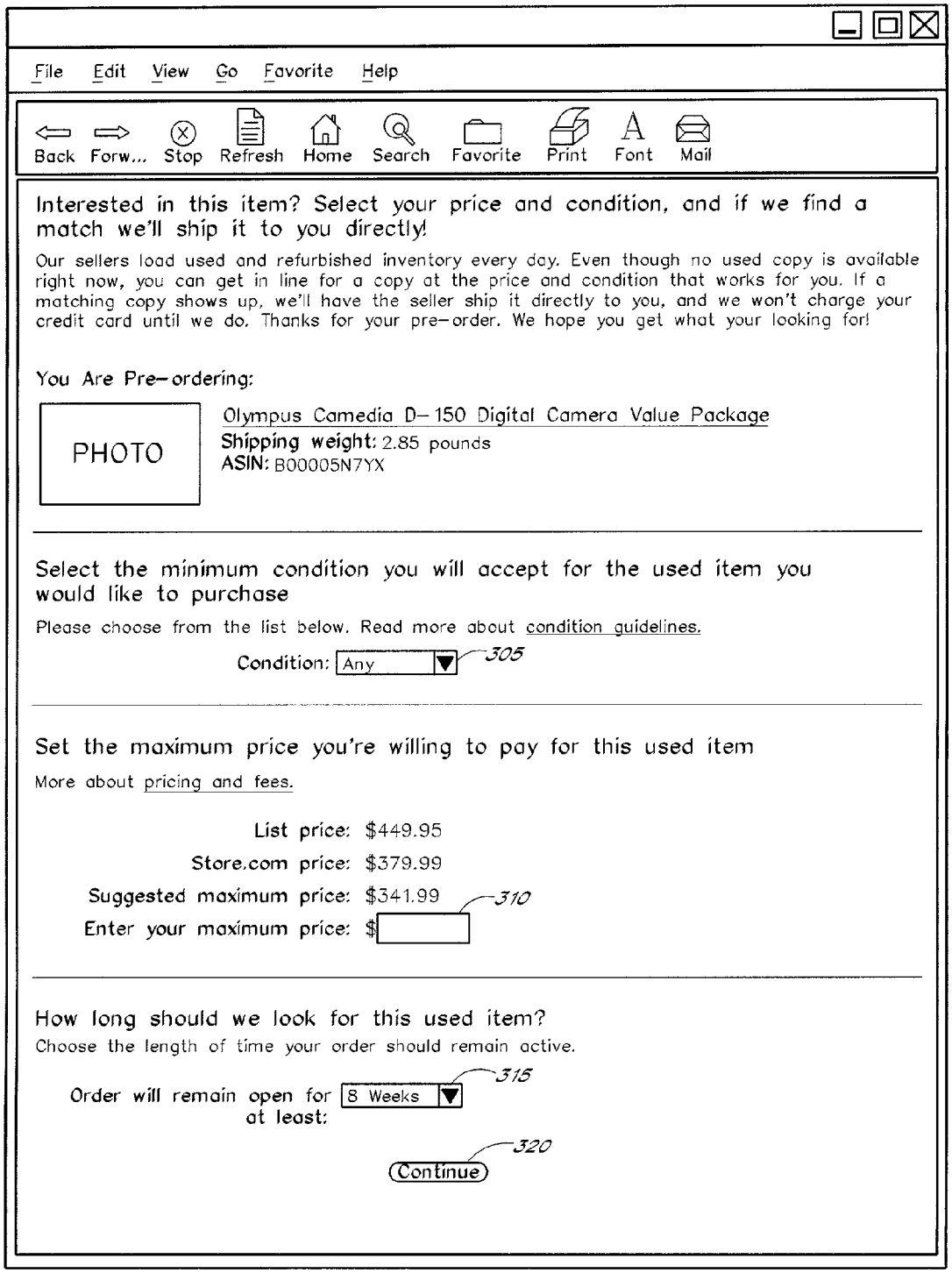
FIG. 3A illustrates an example web page for creating a preorder listing for the product featured in FIG. 2.

FIG. 3A illustrates the general form of a "preordering" page 300 that may be displayed in response to a buyer requesting to pre-order an item on a product's detail page, such as by the use of the preorder button 215 shown in FIG. 2 (although FIG. 3A corresponds to a different product than that of FIG. 2). As illustrated, the user is prompted with (1) a pulldown menu 305 to specify a minimum acceptable condition of the product (which may be "any," "acceptable," "good," "very good," or "like new" in one embodiment), (2) a box 310 in which to enter a maximum price at which the user is willing to buy the product, and (3) a pulldown menu 315 specifying the length of time the pre-order is to remain active (e.g., one week, four weeks, eight weeks, until purchased). As described below, this data is preferably used by the marketplace system to automatically match pre-order listings with marketplace listings. To assist the user in selecting a suitable maximum price, the system displays the item's list price, the price at which the item is available from the provider seller, and a suggested maximum price. Other price data, such as the average selling price of the item within the marketplace (not shown), may also be displayed. The suggested price may be based on one or more of the criteria set forth above determining suggested marketplace listing prices.

Upon selection of a "continue" button 320, the user may be prompted to confirm the entered information, and in some or all cases, to log in (not shown). The preorder listing is thereafter added to the system, and is displayed on the product's detail page (preferably in summary form, as in FIG. 3B) until fulfillment, expiration, or deletion by the buyer. Thus, similar to the generation of marketplace product listings, the user need only perform several simple steps in order to generate the preorder listing, and need not supply a name, product ID, or other description of the product (since the product is already identified on the detail page from which the process is initiated). The generation of preorder listings is discussed in further detail below with reference to FIG. 8.

Figure 3B:
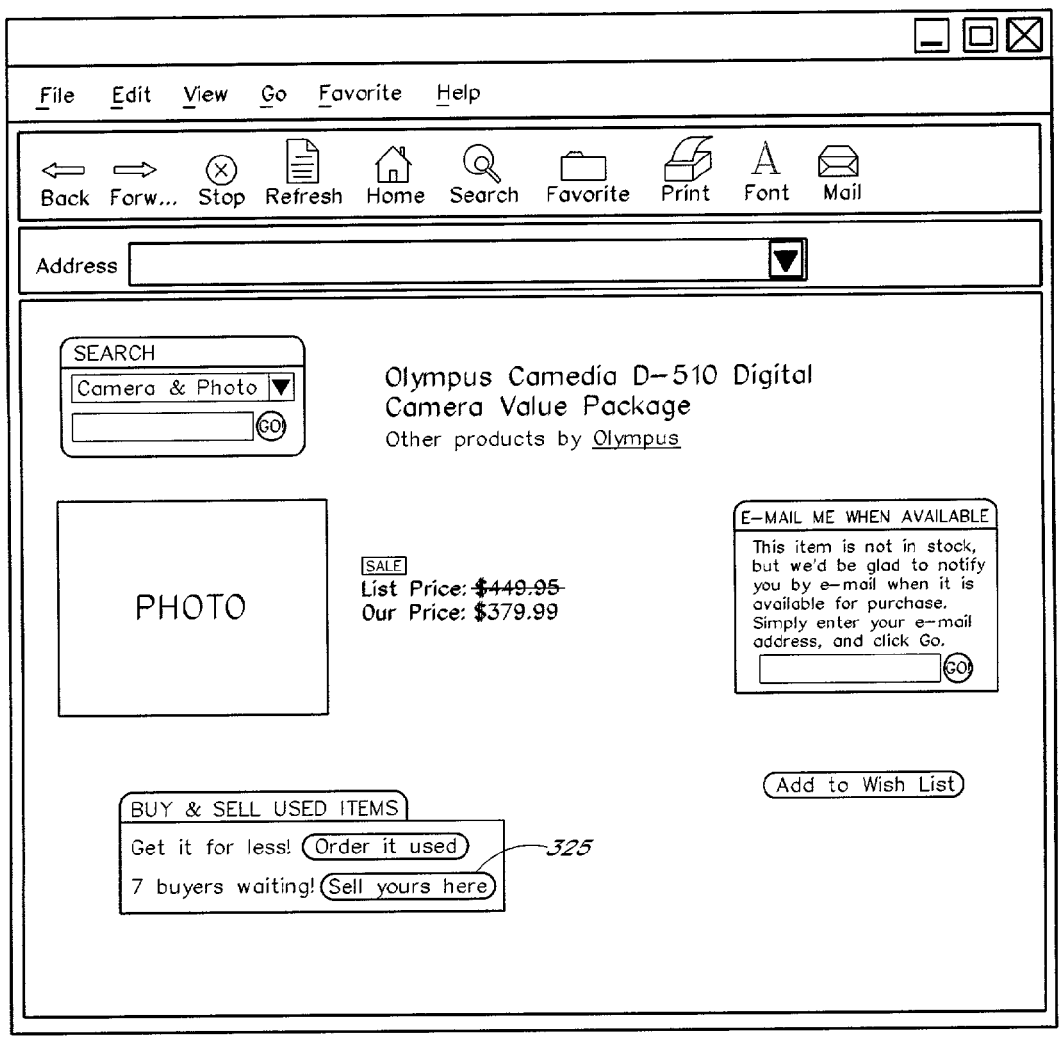
FIG. 3B illustrates an example product detail page showing pending preorder listings for the displayed product.
Figure 3E:
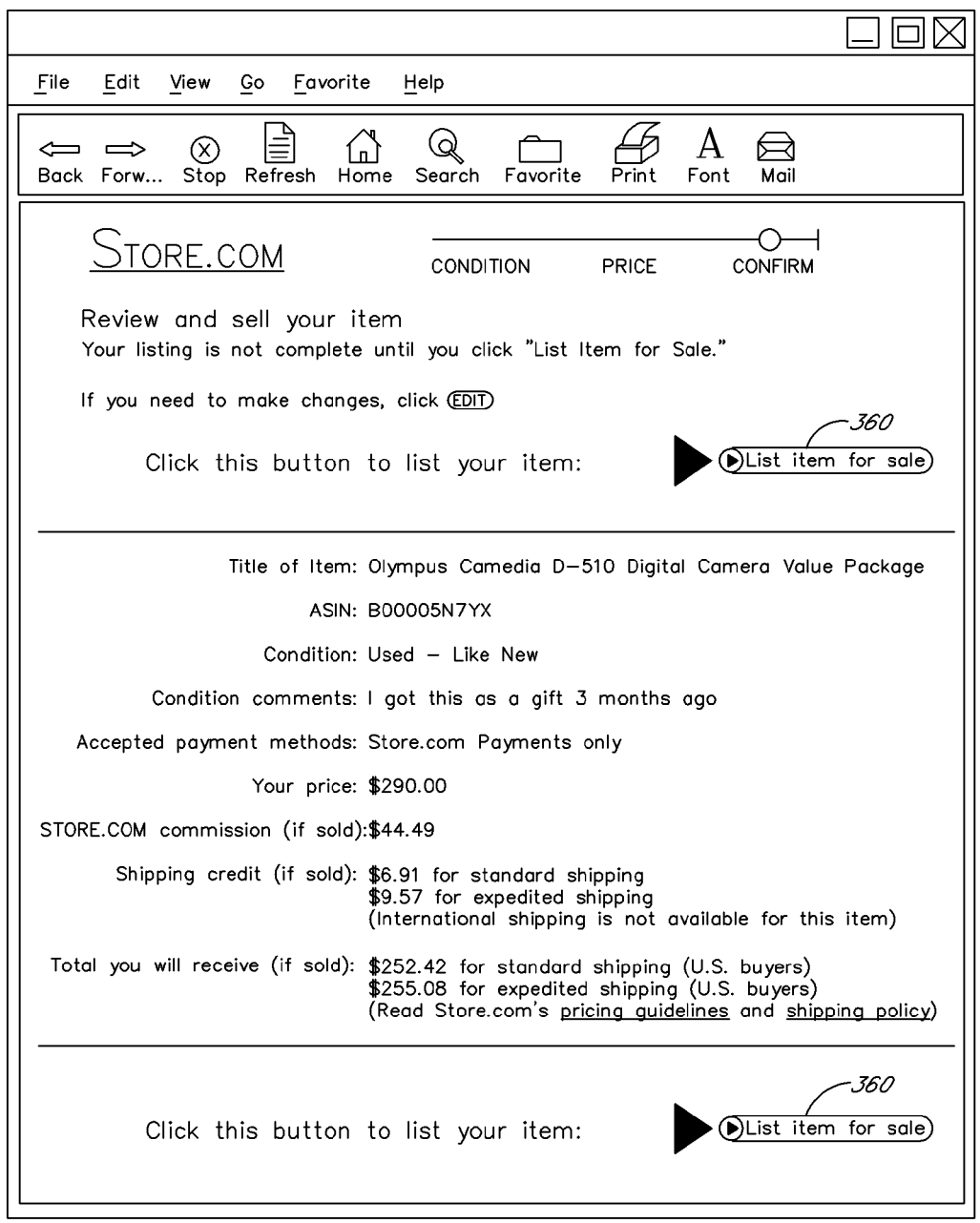

FIG. 3B illustrates an example detail page for a product for which multiple pending preorder listings exist, as indicated by the text "7 buyers waiting." As illustrated by this example, potential sellers of the product are notified of the level of demand that exists for the product within the marketplace. The details of these seven preorder listings, including the minimum conditions and maximum prices specified, are preferably not revealed to potential sellers. A "sell yours here" button 325 is also provided to allow sellers to easily load products to sell in order to satisfy the pre-existing demand for non-provider goods.

C. Creation of Marketplace Product Listings

FIGS. 3C-3E illustrate a sequence of web pages 330, 335, 340 that may be used to create a marketplace product listing according to one embodiment. The example condition page 330 shown in FIG. 3C corresponds to the page depicted after selection of the "sell yours here" button 325 in FIG. 3B. The condition page 330 restates the product to be listed for sale, and prompts the seller to select from a list 345 of predefined product condition descriptors. The types of conditions that may be specified by the seller may be dependent upon the purpose and nature of the particular marketplace system and the category or type of product being sold. In this particular example, the seller is only permitted to offer the item as "used" (i.e., all of the condition descriptors are for used products). In other embodiments, such as when the provider does not offer new products or is out of stock of new products, the seller may be allowed to list the item as "new". The listing of new products may be suppressed so that the new marketplace seller products are only displayed when the product is not currently available from the provider seller.

With further reference to FIG. 3C, once the condition is specified by the seller and a "continue" button 350 selected, the seller is prompted via a price page 335 (FIG. 3D) to enter an optional comment 352 and a selling price 354. The comment 352 may be used to further specify the item's condition, and is viewable by potential buyers (see FIG. 1B). To assist the seller in selecting a selling price, the price page 335 displays the provider seller's price (which preferably serves as a maximum marketplace listing price), a recommended price (given the condition specified on the condition page 330), an average sales price of the item (based on past purchases of used items), and an average price of pending preorder listings (if any). The price page 335 in FIG. 3D also prompts the seller to specify (1) a zip code 356 from which the item will be shipped (for purposes of calculating shipping fees), and (2) whether the seller offers expedited shipping, although one or both of these parameters may be pre-specified by the seller for all of the seller's listings. Upon selection of a "continue" button 358, the system returns a confirmation page 340 (FIG. 3E) from which the seller can edit the information entered or immediately list the item for sale by selecting a button 360 to create the listing.

D. Selecting Items to List from Purchase Histories

As mentioned above, the system may also support the ability for users to list product units for sale within the marketplace from their respective purchase histories. Although this feature is preferably implemented in combination with the above-described feature for adding marketplace listings from product pages in a catalog, each method for creating marketplace listings may be implemented independently of the other without departing from the scope of the inventions.

Figure 4A:
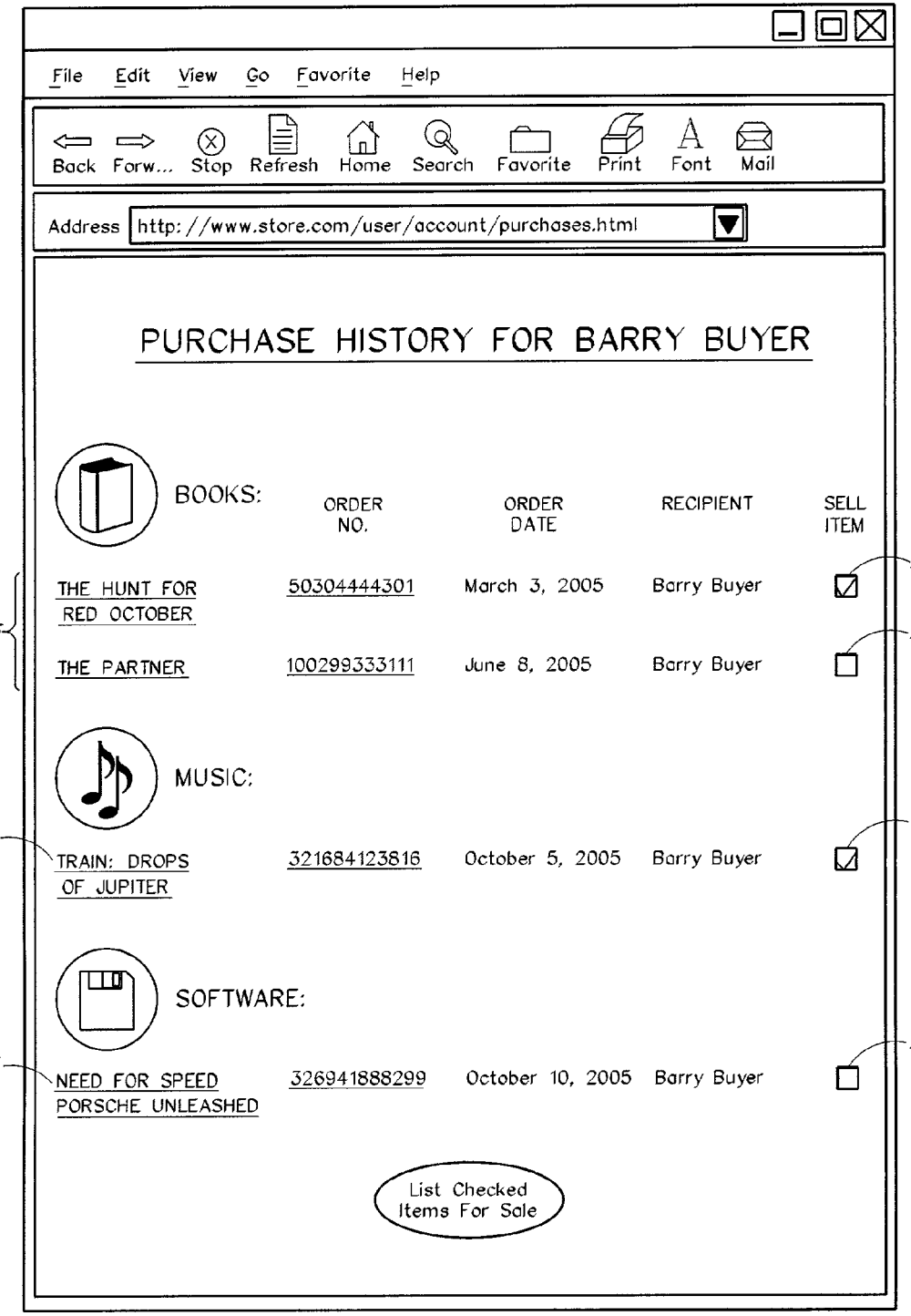
FIG. 4A illustrates an example purchase history page that provides functionality for selecting products to list for sale (or "resale") within the marketplace.

FIG. 4A illustrates an example purchase history page 400 including a listing of products purchased by a particular user from the provider or from a marketplace seller. A user may access such a page in one embodiment by selecting a "Purchase History" option from an "Accounts" page. The user may also specify one or more filters, such as, for example, "last X months," "Music," "Items under $X," or the like, for limiting the items listed on the page 400. The purchase history preferably reflect both purchases made from marketplace sellers and purchases made from the provider seller(s). Although not illustrated in FIG. 4A, the purchase history may also include a listing of products purchased by others as gifts for the particular user. In addition, as the result of partnership arrangements with other merchants, the purchase history may reflect purchases made from third parties, e.g., from other web sites, online stores, physical stores, or other marketplace sellers.

As shown in FIG. 4A, the purchase history page 400 includes listings 405 of previously purchased products, organized, according to the illustrated embodiment, by product subject matter. As is conventional, the listings 405 include a short description or title of the product, with a hypertext link to the product's detail page. In addition, each listing 405 may include one or more of the following types of information (or links to such information): an order number, the price paid, the condition of the item when purchased, an order date, and the shipping recipient.

According to one embodiment, each listing 405 also includes a checkbox 410, providing the user the option of placing the purchased product on sale in the online marketplace. If desired, the user may check multiple boxes to create multiple marketplace listings in parallel. The user may alternatively be required to create the listings serially (one at a time), in which case pages of the form shown in FIGS. 3C and 3D may be used. In such an event, the "condition" field 345 and "price" field 354 shown in FIGS. 3C and 3D may be pre-populated with the values associated with the prior sale, as discussed above.

Selection of the "Sell Checked Items" button in FIG. 4A causes the system to generate and return a resell page 450 of the type illustrated in FIG. 4B. From this resell page, the user can specify the condition and selling price, and enter a comment, for each item to be listed. The user may also be prompted to specify the zip code of the shipping location and the shipping methods supported, as in FIG. 3D. If the item was previously purchased "used" from a marketplace seller, some or all of the check boxes and fields shown in FIG. 4B may be pre-populated by the system with the values used for the prior sale.

As illustrated in FIG. 4B, the resell page 450 may also display suggested prices for each item to be listed for each possible condition. The suggested prices for an item may be generated by the system based on such criteria as the item's list price, the prices at which the item is available from other marketplace sellers, the provider seller's price for the item, the price paid for the item by the user, and/or historical prices paid for the item within the marketplace.

Upon selection of the "Submit for Resale" button (or upon a subsequent confirmation), a separate marketplace listing is created for each item. Preferably, these marketplace listings are displayed on product detail pages as set forth above. Thus, as with the process of creating marketplace listings from product detail pages, the overhead typically associated with uploading product descriptions and images is significantly reduced or avoided.

Figure 4C:
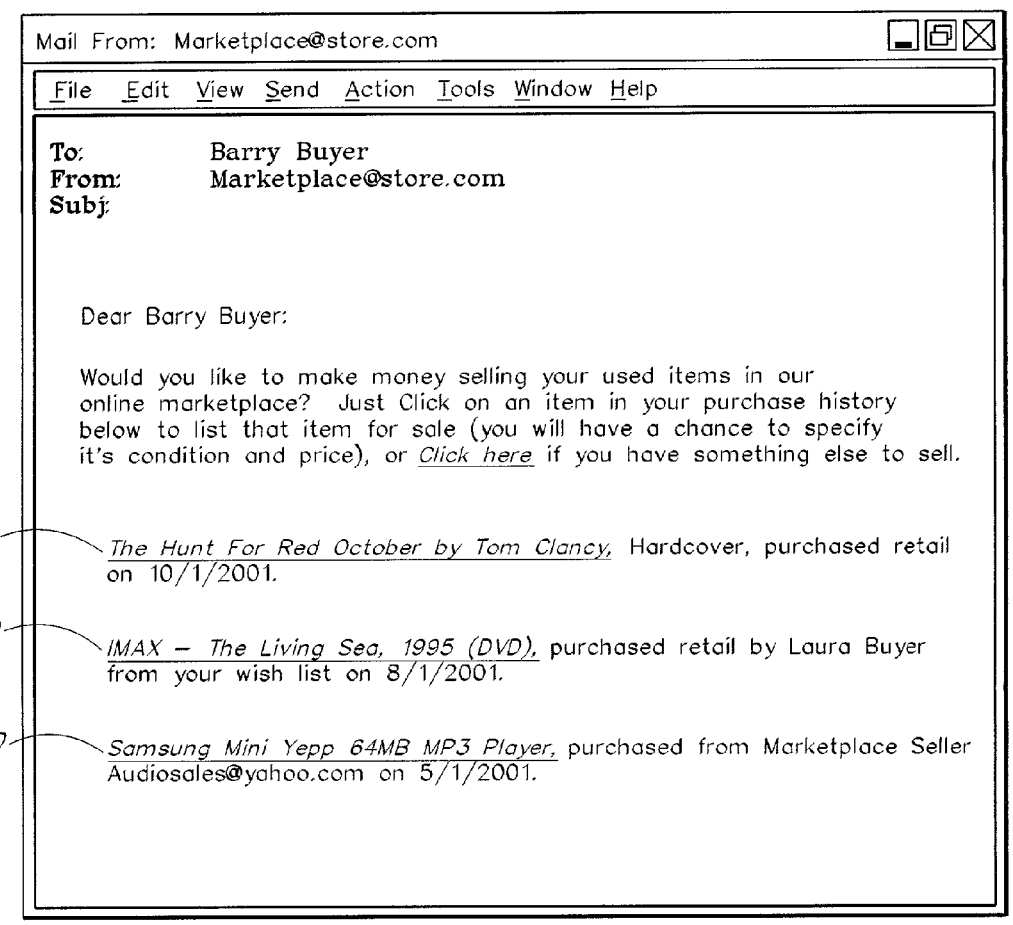
FIG. 4C illustrates an example listing request that solicits a marketplace listing from a user based on the user's purchase history.

As mentioned above, the system may additionally or alternatively use user purchase histories, and/or other evidence of item ownership, to proactively generate requests to users to list their items in the marketplace. An example listing request 455 that is sent via e-mail is depicted in FIG. 4C. When sent by email, these listing requests may include links 460 to web pages for creating the listings. For example, selection of one of the three products/links 460 in FIG. 4C would, in one embodiment, cause the page of FIG. 3C to be displayed, but with the selected product described in place of the "Olympus Camedia" product. An interface of the type shown in FIG. 4A (which supports creating multiple marketplace listings in parallel) may also be used within the listing requests.

As mentioned above, a listing request 455 may be sent to a user in response to one or more of the following events: (1) expiration of a particular time period from prior purchase of item, where such time period may be dependent upon the type or identify of the particular item, (2) submission by the user of review or rating for the item; (3) purchase by the user of a superceding or replacement item; (4) the existence of a threshold number of preorder requests for the item. The marketplace system may also generate listing requests for products other than those actually known to have been purchased by the relevant user. For example, a request to list an item may be sent to a user who merely (1) is the recipient of a wish list or other gift purchase of the item by another user; (2) has submitted a rating or review of the item, (3) has recommended the item to another user through a "community" type service or forum of the system, or (4) has explicitly indicated ownership of the item.

The product detail and other pages of FIGS. 1A-4B represent specific embodiments of the invention, and are not intended to be limiting. Rather, a skilled artisan will recognize from the disclosure herein that a wide number of combinations of differing tags, tabs, links and/or other display elements may be used to covey to a user the product listings and options available. In addition, some or all of the displayed information and options may be presented using displays other than web pages, or may be presented audibly through a voice interface. Further, the number of pages used to create a listing, and the number and types of information elements requested from the listing creator, may be varied from those shown (see, e.g., subsection IV below titled "single-action creation of marketplace listings.")

III. Display of Marketplace Options of Pages of Related Products

In the example pages described above, the options to buy, sell, and preorder a particular product in the online marketplace are presented within a product detail page for that product. One extension is to also display one or more of these options within the product detail pages of related products. For instance, when a marketplace listing exists for product A, this listing may be displayed within the product detail pages of product A plus the N products most closely related to product A. With reference to FIG. 2, for example, selection of the "similar products" tab may reveal a list of products that are related to the product featured on the detail page, together with an indication of whether any marketplace listings exist for each such product. The detail page may similarly include options to sell and/or preorder each such related product.

The display within a given product's detail page of marketplace listings for related products may be made contingent upon whether any marketplace listings exist for the given product. With this approach, the user is informed of listings of related products only when no marketplace listings exist for the product being viewed.

To implement this extension, a table or database may be maintained with information about which products in the catalog are closely related. This information may also be encoded within the HTML or other files used to generate product detail pages. For instance, the coding for product A's detail page may indicate that the page should also display any existing marketplace listings for products B, C and D.

In one embodiment, the "product relatedness" data used to implement this feature is generated automatically by periodically analyzing browsing histories of users to identify products that are frequently viewed during the same browsing session. For example, products A and B may be deemed related because a large percentage of users who viewed A also viewed B during the same session. An important attribute of this method is that the related products reflected in the table tend to be substitutes (because customers tend to view like or substitute products during individual browsing sessions). Product relatedness data may also be generated based on user purchase histories (e.g., products A and B are related because a large percentage of customers who bought A also bought B). Example methods for identifying related products using product viewing and purchase histories are described in U.S. patent application Ser. No. 09/821,712, filed Mar. 29, 2001, and U.S. Pat. No. 6,266,649, the disclosures of which are hereby incorporated by reference. The task of identifying related products may alternatively be performed using other sources of information, such as product descriptions and/or product classifications.

IV. Single-Action Creation of Marketplace Listings

As mentioned above, the online marketplace system may also support the ability for users to add marketplace product listings through a single mouse click or other single action, without the need to perform any further action. This may be accomplished, for example, by providing multiple single-action buttons or other links, each of which corresponds to a particular condition and selling price for listing the displayed product. For example, the following single-action links may be displayed in addition to the option to manually enter the condition and price: "Like new—list immediately for $20;" "Very good condition—list immediately for $18;" "Good condition—list immediately for $15," or the like.

The foregoing single-actions links for a given product may be displayed in the product's detail page, in the purchase history of a user who purchased the product (see FIG. 4A), and/or in a listing request transmitted to a user. Selection of such a single-action link preferably causes the advertised transaction to be completed without further action by the seller, although the seller may be permitted to subsequently cancel the transaction. In one embodiment, the option to post new marketplace listings by single action may be enabled and disabled by users as an account setting.

V. System Architecture

Figure 5A:
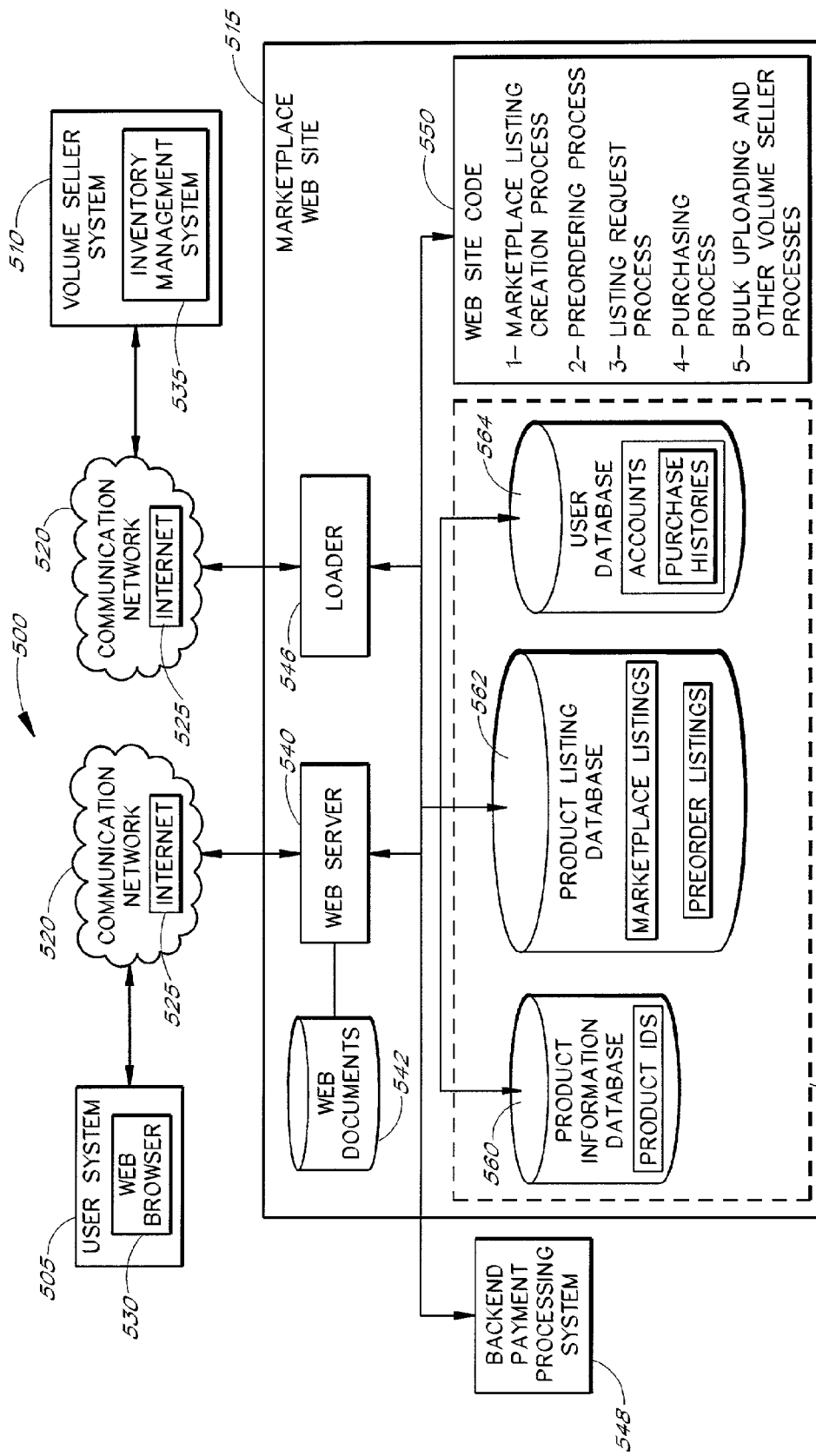
FIG. 5A illustrates a block diagram of an example web-based implementation of the marketplace system.

FIG. 5A illustrates the user and system components to enable marketplace sales according to one web-based embodiment. One or more user devices or systems 505 (one shown) allow users to access a marketplace web site system 515 over a communication network 520, such as the Internet 525. Similarly, one or more volume seller systems 510 may access the marketplace web site system over the communication network 520. The marketplace web site system 515 preferably includes or communicates with a backend payment processing system 548 that handles such tasks as credit card processing and ACH (Automated Clearing House) transfers. Although the marketplace system is in the form of a web site system 515 in the embodiment of FIG. 5A, other types of server systems may be used (e.g., those of an online services network or interactive television system).

The user systems 505 in the illustrated embodiment can be any type of computing device that enables a user (including both buyers and sellers) to interactively and remotely access the marketplace web site system 515 via the communication network 520. Each such device 505 runs a web browser 530, such as Netscape® Navigator, Microsoft® Internet Explorer, or a micro-browser adapted for use on a handheld device.

As will be appreciated, the type or types of user devices 505 supported will generally depend on the type of platform used to host the marketplace system (e.g., web site, online services network, interactive television system, etc.). For example, in some embodiments, the user system 505 may be in the form of an interactive television, a computing device that runs a proprietary client program, an interactive kiosk, a personal digital assistant, or a telephone that connects to an Automated Voice Recognition ("AVR") system.

The volume seller systems 510 may be any of the foregoing types of user systems 505, or a combination thereof. Typically, the volume seller system 510 will include an inventory management system 535 which stores and tracks information regarding the inventory of the volume seller, such as, for example, product information, product IDs, quantities, and if applicable, product conditions. In one embodiment of the marketplace web site, a volume seller may export its inventory data into a spreadsheet (or create the spreadsheet manually), and then upload the spreadsheet to the marketplace web site system 515 to create the associated marketplace listings. Although bulk uploading support for volume sellers is preferably provided, such support may be omitted.

The marketplace web site system 515 hosts the electronic catalog, and provides the various functionality and services of the marketplace system. The web site system 515 may be implemented using Windows or Unix based server systems, although other types of computer systems may be used. As mentioned above, the web site may be operated by a provider seller that uses the electronic catalog to sell retail items to customers. The provider seller may also take commissions on, and/or otherwise charge fees for, the listing and sales activities of marketplace sellers. In some embodiments, the marketplace system may include multiple, distinct web sites 515 or other systems, including web sites associated with affiliated merchants; for example, where multiple provider sellers are involved, each may host its own catalog content on its own respective web site. In still other environments, the operator of the marketplace web site system 515 may limit its role solely to creation and maintenance of an accurate catalog of goods, with all new and used goods being offered for sale by third parties.

Figure 5B:
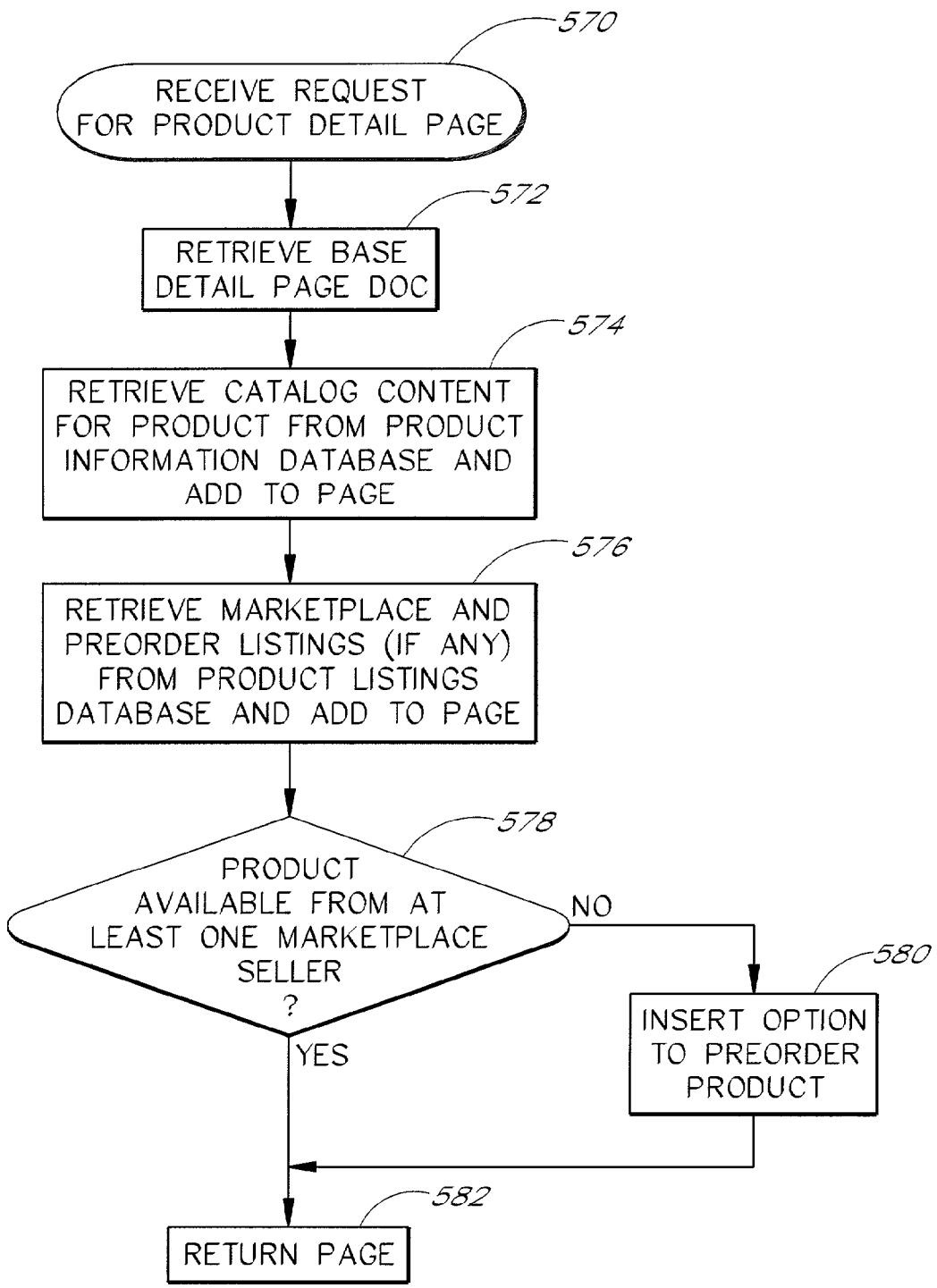
FIG. 5B illustrates a process for generating a product detail page.

As illustrated, the marketplace web site system 515 includes a web server 540 which accesses a database of web documents 542 and related content. The web documents 542 may include standard HTML documents and templates, as well as other types of documents, used to generate web pages of the types depicted in the preceding figures. The documents used to create product detail pages, and other types of pages that include dynamic content, preferably include coding that specifies the particular database look-up operations needed to obtain the dynamic content. An example process that may be used to generate product detail pages is illustrated in FIG. 5B and is discussed below.

The marketplace web site system 515 also includes a database collection 544, a loader 546, and web site code 550. The web site code 550 includes various service components used to generate dynamic web pages and to process form submissions and requests submitted by users. Flow diagrams for some of the processes embodied within the web site code are included in FIGS. 5B-10 and are described below.

As shown in FIG. 5A, the database collection 544 preferably comprises a product information database 560 (also referred to as a "product database"), a product listing database 562, and a user database 564. Each database may be in the form of a relational database, a flat file system, and/or any other type of suitable data repository. A greater or lesser number of databases may be used.

The product information database 560 stores information about the various products that users can purchase and sell through the marketplace web site, and is the primary source of the catalog content displayed in product detail pages (and other types of pages). The product information stored in this database may include, for example, product IDs, product names and descriptions, product images, customer and professional reviews, information about which products are similar to other products, prices, and other types of information as described above. As is conventional, the information for each item may be arranged within fields, such as "author," "title," and "product ID" fields, enabling the catalog to be searched by users on a field-restricted basis using a search engine of the web site.

The product information database 560 may include two or more sub-databases, each of which is associated with a particular type or category of product. For instance, book titles may be represented in a bibliographic database that is separate from a database used for electronics devices.

The product information database 560, or another appropriate data repository, may also store lists of products that tend to be purchased in sequence (e.g., Harry Potter books 1-4). This information may be used, for example, to trigger the generation of a listing request when a user purchases the next product in the sequence (e.g., soliciting listing of Harry Potter book 1 upon purchase of Harry Potter book 2). The sequences may be specified by administrators, and/or may be detected by a software component that analyzes user purchase histories. The product database 560 may also store information about products that are deemed to supersede one another, and this information may similarly be used to generate listing requests.

The product listing database 562 stores information about the various types of listings, including marketplace product listings and preorder listings. This database may also store information about which products, if any, are currently available from a provider seller, and may store non-catalog-based listings. For each marketplace or preorder listing, the product listing database 562 preferably stores information about the type of the listing, the product to which it corresponds (which may be specified by an ASIN or other product ID), the creator of the listing, and the status of the listing (pending, fulfilled, expired, etc.). Some of this information may be in the form of links or pointers to entries or records in other databases 560, 564. As product detail pages are accessed by users of the marketplace web site, the product listing database 562 is queried to determine whether any marketplace or preorder listings exist that should be displayed on such pages.

The user database 564 stores information about existing users of the marketplace web site system 515. For each user, this information may include, for example, a name, password, shipping address, e-mail address, payment information, bank account information (particularly for sellers who have elected to have sales proceeds deposited into their bank accounts), wish list contents, preference settings, and a purchase history. Each purchase history may include information about the purchases made by and for a respective user, including the relevant product IDs, purchase prices, product conditions, and purchase dates.

With further reference to FIG. 5A, the web site system also includes a loader component 546 that provides functionality, including application program interfaces (APIs), for volume sellers to perform bulk uploads as described above. The bulk uploading process is described in further detail below.

FIG. 5B illustrates a process that may be used by the web site system to generate product detail pages in response to requests from user devices 505. Initially, the web server 540 receives a page request that identifies a particular product (e.g., by its ASIN or other product ID), and retrieves a template or other base document for generating a product detail page (blocks 570 and 572). The base document preferably includes a link for initiating creation of a marketplace listing, as in FIGS. 1A and 1B.

To populate the detail page, the web server 540 invokes code 550 that accesses the product information database 560 and the product listings database 562 to retrieve catalog content and pending listings, respectively, for the subject product (blocks 574 and 576). The information about pending marketplace listings and/or preorder listings may be displayed on the page in a summarized form, as in FIG. 1A. In some embodiments, the page may also be customized or personalized for the particular user who requested the page, as is known in the art.

The data retrieved from the databases 560, 562 may also include information about whether the product is currently available from a provider seller. This information may be used to determine the types of purchase options to display within the page (not shown). As mentioned above, any marketplace listings for "new" products may be omitted from the display if the product is currently available from a provider seller.

As depicted by blocks 578 and 580 in FIG. 5B, if the product is not currently available from a marketplace seller, the page is preferably generated to include an option to preorder the item from an unspecified marketplace seller, as in FIG. 2. In some implementations, the preordering option may alternatively be displayed regardless of whether the product is currently available from a marketplace seller. Further, the option to preorder may be restricted based on the types of marketplace listings that currently exist; for instance, if the product is currently available from marketplace sellers but not in the "collectable" category, an option to preorder a collectable unit of the product may be provided.

The populated product detail page is finally returned to the requesting user device at block 582.

VI. Example Process Flows

Process flow diagrams illustrating interactions between users and the marketplace web site will now be described with reference to FIG. 6 (showing creation of a marketplace listing), FIG. 7 (showing a bulk uploading process), FIG. 8 (showing creation of a preorder listing), FIG. 9 (showing parallel creation of multiple marketplace listings from a purchase history), and FIG. 10 (showing a purchase transaction). The left side of each such drawing represents actions performed by a user (via a user system 505 and web browser 530), and the actions shown on the right are those of the web site system 515 performed via executable code. As will be recognized, the order in which the actions occur may be varied, and some actions may be omitted.

A. Creation of Marketplace Listings

FIG. 6 further illustrates the marketplace listing creation process depicted in FIGS. 3D-3E. As described above, this process may be used to create a marketplace listing from a product detail page or a purchase history listing. As illustrated, the user initially selects a "sell" option for a particular product (block 605), and specifies the product's condition (block 610). As described above, the condition can preferably be specified by selecting a predefined condition descriptor ("like new," "very good," etc.), and may be further specified by entering a textual comment. In response to submission of the condition information, the system preferably looks up pricing information from the product information and product listing databases 560, 562 (block 615), and returns such information (and/or price values calculated therefrom) to the user system 505 for display. FIG. 3D illustrates examples of the types of price information that may be returned to assist the seller in selecting a selling price.

As depicted by blocks 620 and 625, the seller then specifies the selling price and the location from which the product will be shipped. The location information is preferably used by the system to calculate shipping costs to be charged to the buyer. The seller may also be asked to specify the shipping methods supported, as in FIG. 3D.

The user may also be prompted to sign-in, and if applicable, to register as a seller (block 630). In one embodiment, an unregistered seller may finish creating the marketplace listing before registering, although buyers may be prevented from buying the listed item until registration is complete. As part of seller registration, the seller may be required, or given the option, to specify a bank account into which sales proceeds are to be automatically deposited by ACH transfer.

In response to submission of the various information items, the web site system preferably generates a transaction summary page of the type shown in FIG. 3E (block 635). From this page, the user can confirm the transaction (block 640). Upon such confirmation, the web site system preferably determines whether the new marketplace listing satisfies or "matches" any preorder listings that exist for the product in the product listing database 562. A match with a preorder listing may be deemed to occur if both (1) the selling price is equal to or below the "maximum price" of the preorder listing, and (2) the condition specified by the seller is the same as or better than the minimum condition specified in the preorder listing (see FIG. 3A). If multiple matches exist, the preorder request that was created first may be used. If a match is found, the seller may be immediately notified that a buyer has been found, and the new marketplace listing may be prevented from being displayed to other potential buyers.

Finally, the product listing database 562 is updated to reflect the new marketplace listing, as well as the outcome of the search for a matching preorder. If no match was found, this update will cause the newly added marketplace listing to be displayed on the product's detail page when the page is loaded by a user (see FIG. 5B). If a match was found, the matching preorder listing will be fulfilled, and will not be displayed on the product's detail page. As part of the fulfillment process, a pre-designated credit card of the buyer (i.e., the user who created the associated pre-order listing) may be charged, and a portion of the proceeds deposited into the account of the seller. In addition, the seller may be notified by email, or via a web page, of both the sale event and the shipping address of the buyer.

B. Bulk Uploading Process

Figure 7A:
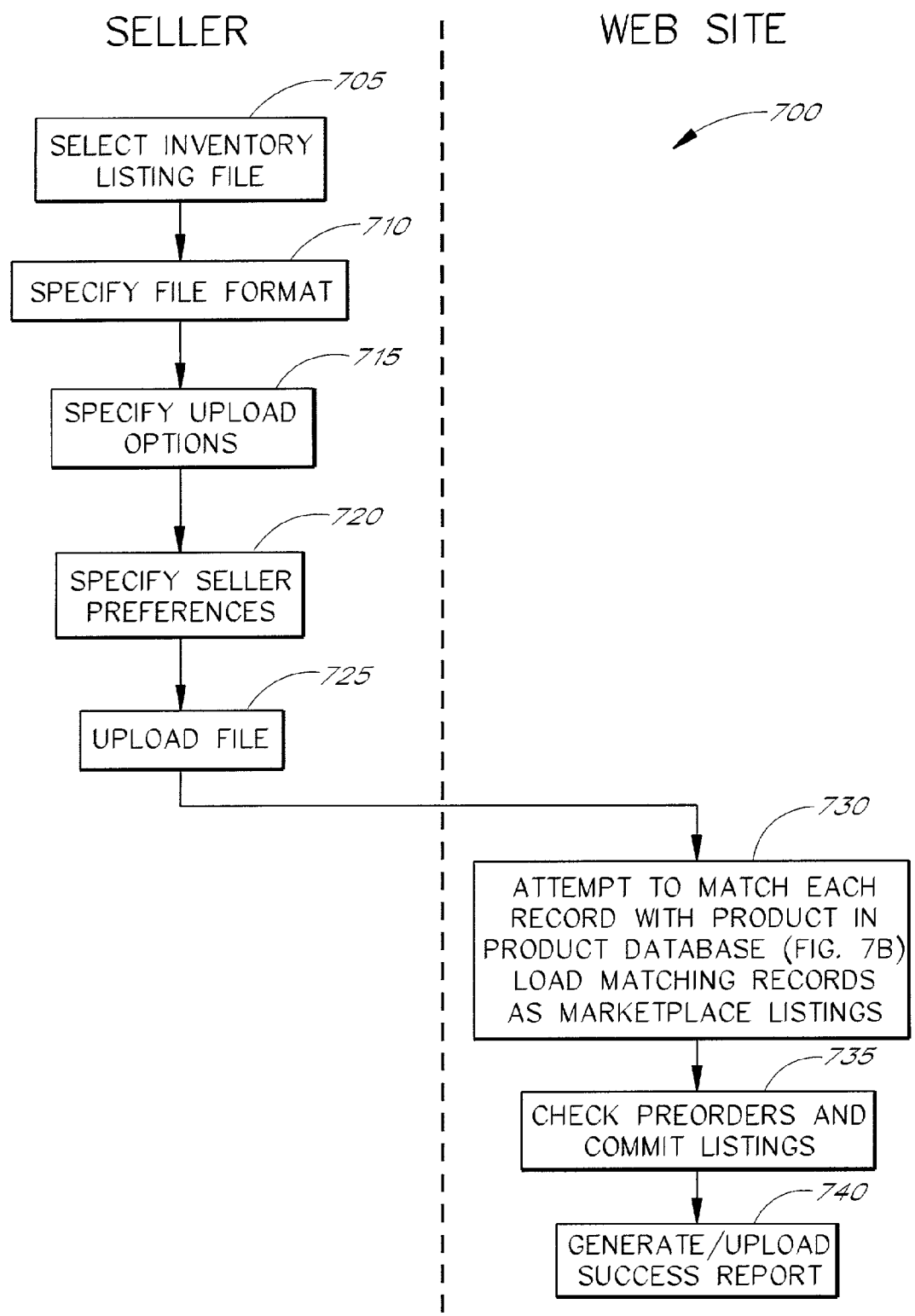
FIG. 7A illustrates a bulk uploading process that may be used by volume sellers to list products for sale.

FIG. 7A illustrates a bulk uploading process 700 for loading inventory data of a volume seller according to one embodiment. To assist the volume seller, the marketplace web site may provide instructions regarding the data and file formats supported, and may provide web forms for prompting the volume seller for the various information items needed. As shown in FIG. 7A, the volume seller initially selects an inventory listing file to upload to the marketplace web site 515 (block 705). The seller may select or create the inventory listing file using the inventory management system 535, or may create the file manually.

In implementations that support multiple file formats, the volume seller may also specify the format of the inventory listing file to be uploaded (block 710). The volume seller may also specify the format or type of data included in the file. For example, information pertaining to book listings may follow a number of standardized formats. The data fields used to specify the items to be listed may vary depending on the type of product involved.

As depicted by block 715, the volume seller may also review and select various upload options which define the type of replacement algorithm to be executed with respect to the volume seller's product listings. For example, the upload options may include "Add/Modif/Delete," "Modify/Delete," "Purge/Replace," or the like. According to one embodiment, the "Add/Modify/Delete" option causes the system to add listings which are new from the seller, modify those listings which have changed, and delete those listings no longer included in the inventory listing file. The "Modify/Delete" option, which may be used when the inventory listing file contains no new entries, causes the system to perform a simple comparison against a previous version of the inventory listing file, and to update the product listings database with any changes. The "Purge/Replace" option instructs the online marketplace system to purge all previous product listings of the volume seller from the product listing database 562, and to load the replacement listings of the inventory listing file. The seller may also be prompted to review and select preferences associated with the upload operation (block 720), such as shipping preferences.

In one embodiment, the volume seller is also be prompted to specify whether the listing descriptions or "records" specified in the inventory file are to be loaded (1) as catalog-based or "marketplace" listings that are displayed in the catalog in conjunction with corresponding product descriptions, (2) as non-catalog-based listings that are not displayed in conjunction with corresponding product descriptions, or (3) as either catalog-based or non-catalog-based listings, depending upon whether an ASIN or other recognized product ID is supplied or can be identified. For purposes of the following description, it may be assumed that the volume seller has specified either option 1 or 3, and thus wishes to have at least some of the bulk-uploaded items appear on corresponding product pages in the catalog.

Upon uploading the inventory file (blocks 725 and 730), the loader 546 parses the file and attempts to match each record to an existing product represented in the product database 560 and catalog. When a record in the uploaded file includes a product ID (ASIN, UPC, ISBN, etc.) that matches a product ID in the product database 560, the loader 546 simply loads the record into the product listing database 562, causing the listing to thereafter appear on the product's detail page (assuming no matching preorder listing exists).

When a record in the uploaded file does not have a product ID, the loader 546 preferably executes one or more search routines to attempt to match the record with a product represented in the products database 560, to thereby assign a product ID to the record. For example, if the inventory listing file specifies a manufacturer and model number, the loader may search the products database 560 for a product of like manufacturer and model number. When a single match is found as the result of the search, the loader 546 loads the record into the product listing database 562 together with the product ID of the matching product, causing the new marketplace listing to appear on the matching product's detail page. The matching logic used in one embodiment is detailed in FIG. 7B. In addition, an example matching routine used for bulk-uploaded book listings is summarized in Table 1.

When the loader is unable to find a matching product record in the product database 560, the loader may perform one or more of the following actions: (1) load the record as a non-catalog-based listing (e.g., if the user has enabled this option), (2) store the unmatched listing for review by an administrator, (3) reject the listing, or (4) query the inventory management system 535 of the volume seller for more information.

Upon completion of the matching process, the web site system preferably attempts to find preorder requests, as described above, that may be fulfilled by the newly added marketplace listings (block 735). In some cases, an uploaded marketplace listing may specify that the volume seller has multiple units of the item to be listed, in which case the marketplace listing may be used to fulfill multiple preorder listings.

Finally, the loader 546 generates and returns a report (block 740) indicating the success or failure of each attempt to add a new marketplace listing.

TABLE 1

Process for matching bulk-uploaded record to Product ID (ASIN)

Given the item-name of the book:
Use search APIs to retrieve the ASIN of the exact title
If no ASIN matches exact title, perform a wild card title search using search APIs
For each ASIN obtained from search, fetch record from database
Check author name, publisher, publish date and the binding information of the incoming record against this database record.
Calculate accuracy score based on how much information in incoming record and database record is the same.
Compare all ASINs based on the total score and availability
Pick/reject ASINs based on set of rules (see appendix)
For an in-print ASIN, all of the fields may be required to match.
For an out-of-print (oop) ASIN, only the item-title and author name fields may be required to match.

Figure 7B:
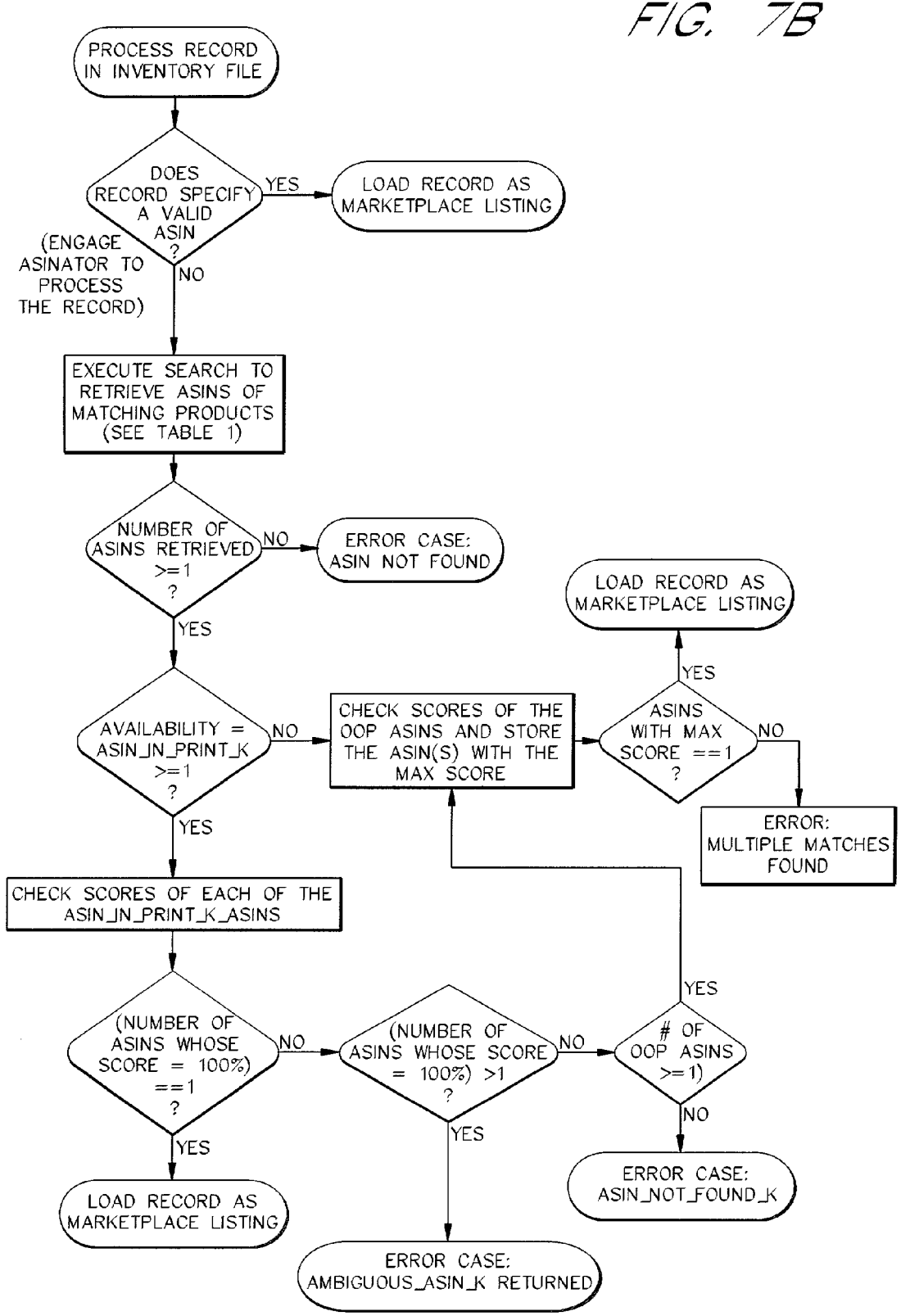
FIG. 7B illustrates representative logic for matching an uploaded product with a product description contained in a catalog.

FIG. 7B illustrates the logic used in one embodiment to attempt to uniquely match a record in an inventory file to a product (and thus ASIN) in a product database. If a single match is found, the record is associated with the ASIN of the matching product, and the record is loaded into the product listings database as a marketplace listing for display on the matching product's detail page. If either (1) no matches are found, or (2) multiple matches are found, the record is not loaded as a marketplace listing but may be loaded as a non-catalog-based listing. A scoring process is preferably used to determine whether a "match" exists.

C. Preordering Process

Figure 8:
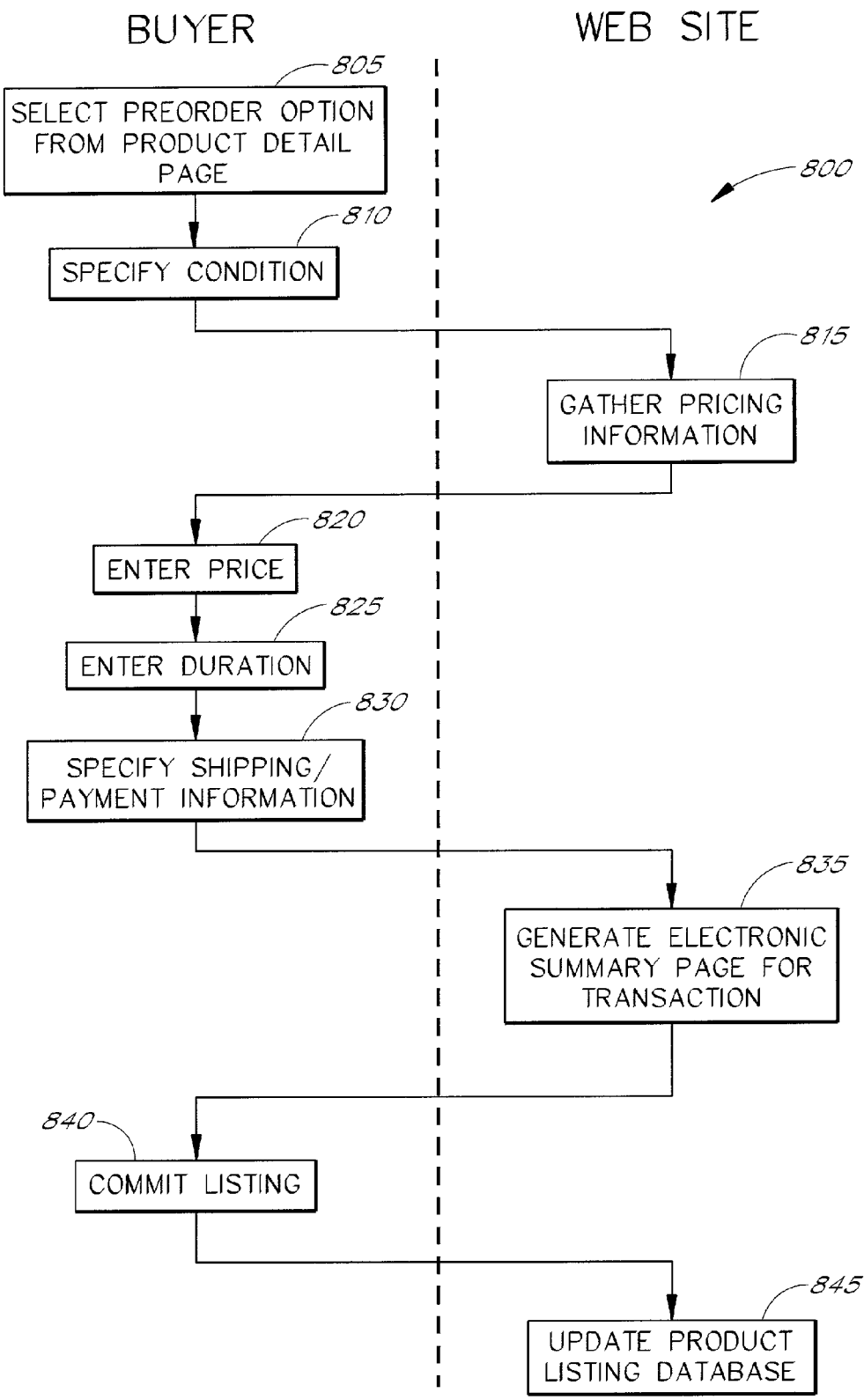
FIG. 8 illustrates a process by which a user may preorder a product.

FIG. 8 further illustrates a preorder process 800 by which a user may preorder a product, as depicted in FIGS. 2 and 3A. As described above, the user preferably initiates this process from the product's detail page (block 805). In some embodiments, users may also or alternatively be permitted to initiate preordering from other types of catalog pages, including browse node pages and other pages that feature multiple products.

The user first specifies the minimum condition of the product (block 810). As depicted in block 815, the system may use the condition descriptor selected by the buyer to suggest a price. The price may alternatively be suggested without regard to the condition specified by the buyer, as in FIG. 3A. The user then enters the price (taking into account or ignoring the suggested price) (block 820), the maximum duration the listing is to remain active (block 825), and payment and shipping information for purchasing the product (block 830). The user may also be prompted to sign in or register (not shown).

The system then generates and returns a transaction summary page that provides an option for the user to confirm the transaction (block 835). If the user confirms the transaction (block 840), the system updates the product listing database 562 with the preorder listing (block 845), causing the preorder listing to thereafter be displayed on the product's detail page. A background task may be executed periodically to remove unfulfilled preorder listings that have expired.

D. Listing Requests

Figure 9:
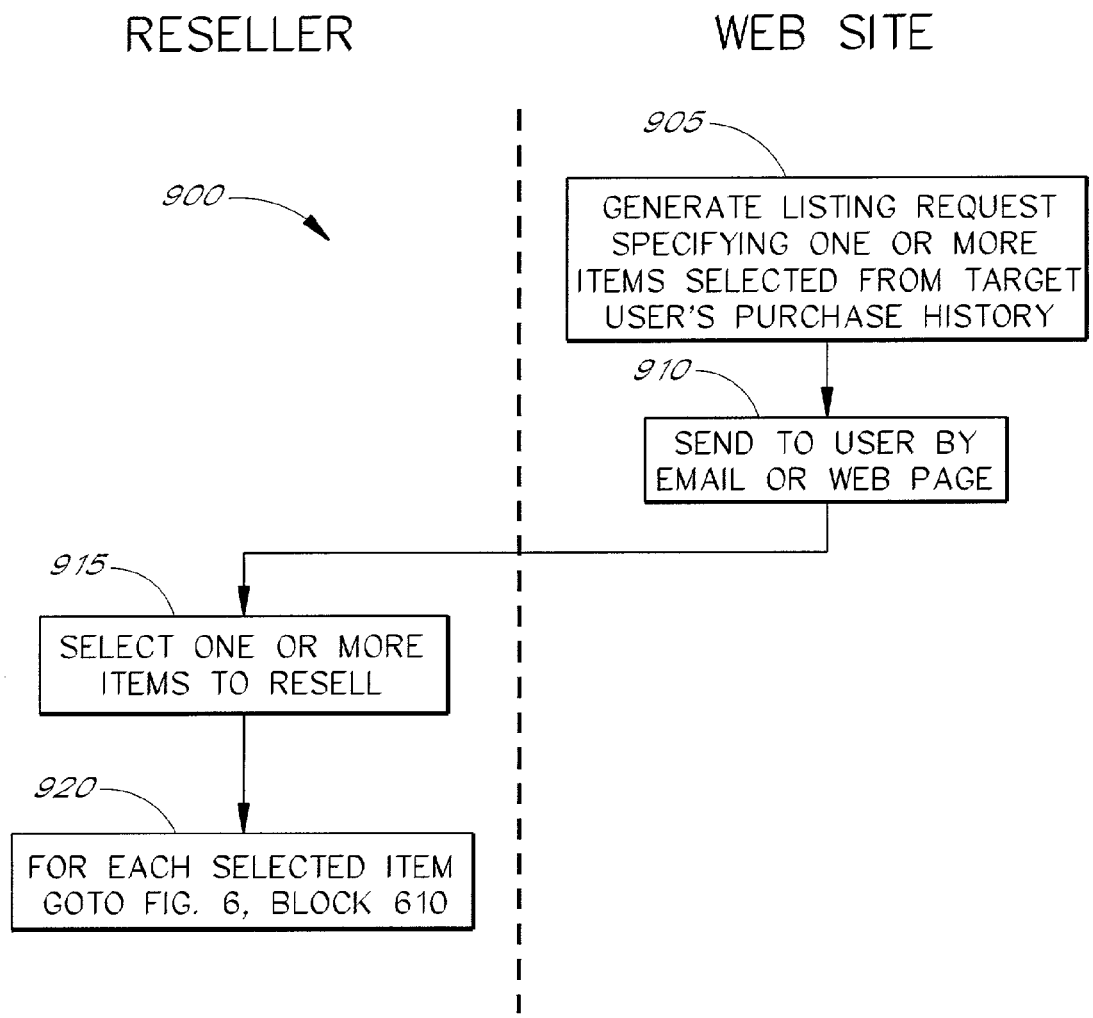
FIG. 9 illustrates a process by which a marketplace listing may be created for a product listed in a user's purchase history.

FIG. 9 illustrates a general process 800 by which the marketplace system may use listing requests to solicit new marketplace listings. As mentioned above, the transmission of a listing request to a user may be triggered by a particular event, such as passage of a selected time interval from a product's purchase, submission by the user of a review or rating, purchase by the user of a superceding product, or the existence of preorders for the product. As depicted by blocks 905 and 910, the listing request may be for one or more products in the target user's purchase history, and may be conveyed by email or a custom web page. Pop up windows and other display methods may also be used.

For each product, the listing request preferably includes a link to a page of the type shown in FIG. 3D, allowing the user to initiate creation of a marketplace listing. The link is preferably a hyperlink that may be selected by the user, but may alternatively be a simple URL (uniform resource locator) that may be copied into the address field of a browser. The ID of the product may be encoded within this link to allow the web site system to identify the product upon selection of the link. As depicted in blocks 915 and 920, for each product selected by the user to resell, the process beginning at block 610 of FIG. 6 may be repeated. The listing request may also support the ability for the user to create multiple marketplace listings in parallel, as depicted in FIGS. 4A and 4B.

E. Purchasing Process

Figure 10:
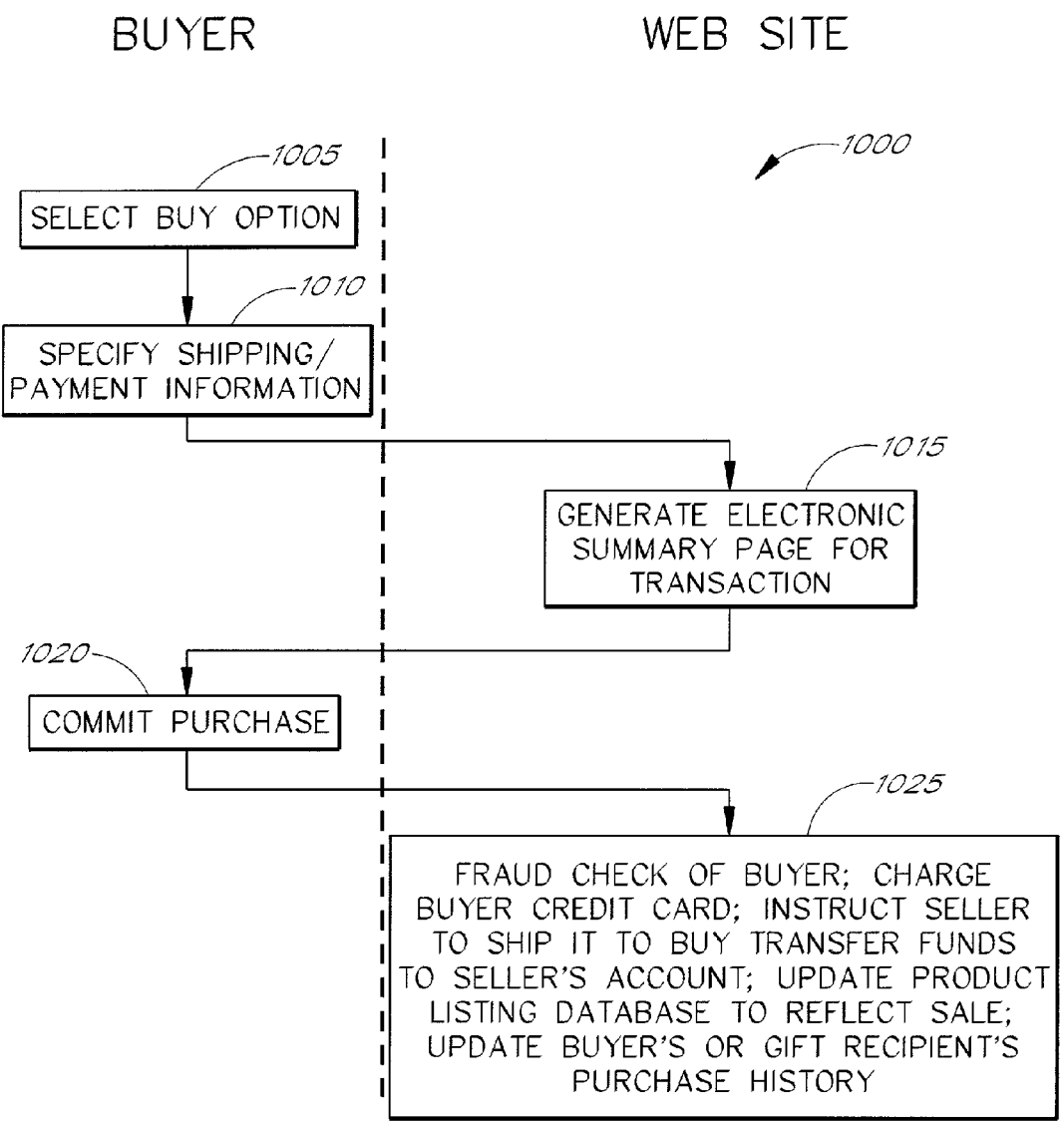
FIG. 10 illustrates a buying process for making a purchase.

FIG. 10 illustrates a process 1000 that typically occurs when a buyer makes a purchase from a marketplace listing. This process may be initiated, for example, when a buyer selects an "add to cart" button (not depicted) or a "buy from seller" button 129 (see FIG. 1B) from a product detail page (block 1005). In response to the buy request, the web site system prompts the buyer to specify the shipping address and payment method (block 1010). The buyer may typically specify each such item of information either by selecting/confirming information retrieved from the user database 564, or by entering new information. In some cases (not illustrated), single-action ordering may alternatively be used, in which case pre-specified shipping and payment information are used to immediately complete the transaction.

In the illustrated example, the system then generates and returns a transaction summary page that provides an option for the user to confirm the transaction (block 1015). If the user confirms the transaction (block 1020), the system performs the following actions: (1) performs a fraud check of buyer/seller; (2) charges the buyer's credit card (or otherwise collects payment); (3) transfers resulting proceeds, minus a commission, by ACH to the seller's bank account (although the proceeds from multiple sales may be aggregated for purposes of such transfers); (4) updates the product listing database 562 to reflect the sale, and (5) sends a purchase notification message by email to the seller with shipping instructions (block 1025). These actions (1)-(5) are also performed when a preorder listing is matched with a marketplace listing. Additional communications may also be transmitted to the buyer or seller, depending on the processes selected by the marketplace operator.

A purchase confirmation may also be transmitted by email to the buyer (not shown). In some cases, this confirmation may include a shipment tracking number obtained from the seller, or may specify a store location from which the purchased item may be picked up. This information is also transmitted to the user database 564, so that the user may access the order history by viewing his or her account.

If persistent marketplace listings are supported, the system may also decrement an inventory count associated with the listing. Once this inventory count reaches zero, the marketplace listing is removed from the catalog.

VII. Other Services and Components

The marketplace system may also include application components for providing a variety of other services to volume sellers. For example, the system may communicate order fulfillment reports or other sales information to volume sellers in an aggregated or bulk format. In addition, the system may support the ability of a seller system 510 to periodically poll the web site to request inventory updates.

The marketplace system may also communicate from time to time with volume seller systems 510 to ensure that product listings match current inventories. For example, some volume sellers may list their large inventories for a specific product on many online marketplace systems. Thus, at any given moment, multiple systems may attempt to complete a transaction for units of the same product. To reduce the risk that the volume seller will be unable to fulfill a marketplace order, the system may query the volume seller's system 510 to ensure proper inventory before completing a purchase transaction.

The system may also support the ability for a marketplace seller to request that a payment amount be refunded to a buyer because, for example, the inventory of the seller was depleted before the sale, or the buyer was dissatisfied with the item.

The marketplace system may also include application components for providing a variety of other services to assist buyers in identifying and evaluating products to purchase. For example, the web site may include one or more recommendation services for recommending products from the catalog to users based on their respective profiles. In addition, as mentioned above, the web site may include a search engine for searching the electronic catalog; a browse tree for navigating the catalog by category; a wish list service; and a service for allowing users to post product reviews for viewing by others. Example implementations of these and other types of service components that may be used within the marketplace web site are described in the following co-pending U.S. patent application (identified by application number and filing date), the disclosures of which are hereby incorporated by reference: Ser. No. 09/821,826, filed Mar. 29, 2001; Ser. No. 09/442,677, filed Nov. 18, 1999; Ser. No. 09/517,043, filed Mar. 2, 2000; Ser. No. 09/532,230, filed Mar. 22, 2000; and Ser. No. 09/715,850, filed Nov. 17, 2000.

The marketplace web site system may also include components for interfacing with other web sites and systems, such that users of such systems may perform the various functions described herein. For instance, the marketplace web site system may be integrated with an online services network such that users of the online services network can view the product catalog, create marketplace and preorder listings, and make marketplace purchases, using a proprietary client application.

VIII. Metadata Service Based Embodiment

Figure 11:
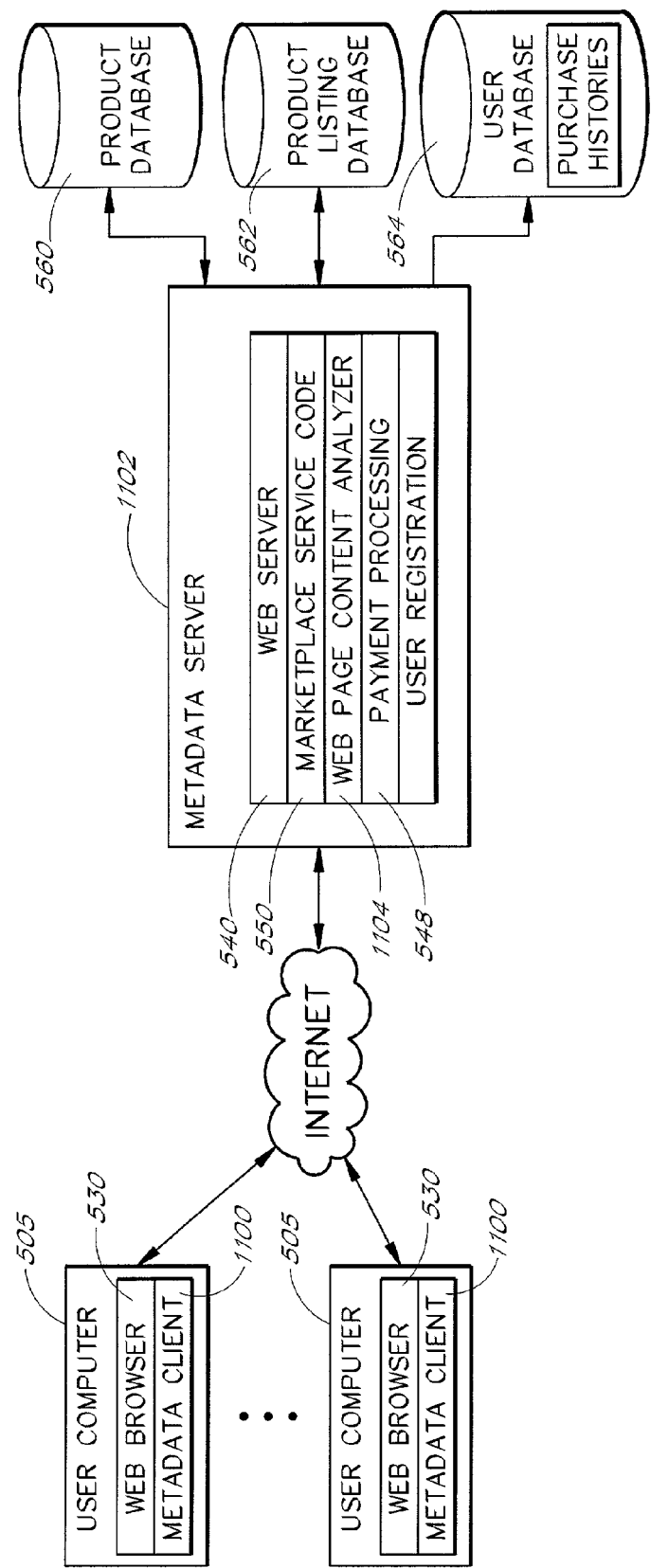
FIG. 11 illustrates an embodiment in which the marketplace service is implemented as part of a web page metadata service.

In the embodiments set forth above, the marketplace system hosts the products catalog used for user-to-user sales, and the product catalog is preferably controlled or administered by a single business entity (i.e., the operator of the marketplace system). In another embodiment depicted in FIG. 11, the entire World Wide Web, or a selected portion of the World Wide Web (e.g., a set of well known product-oriented web sites), is used as the products catalog, and a web page "metadata service" of the type provided by Alexa Internet, Inc. provides the above-described marketplace functionality. Thus, the catalog is effectively hosted and provided in-whole or in-part by third parties who are unrelated to the provider of the metadata/marketplace service, and who may be unrelated to the associated buyers and sellers.

In this embodiment, users of the metadata service download and run a metadata client component 1100, which is preferably a browser plug-in. As a user browses the World Wide Web, the metadata client 1100 running on the user's machine 505 communicates with a metadata server 1102 to retrieve information or "metadata" associated with the page and/or site being viewed. As is known in the art, this metadata may be displayed to the user in a separate window, pane, bar, or other area of the web browser 530, or may be inserted onto the web page being viewed.

The metadata client 1100 and server 1102 also include functionality for detecting that a page being viewed displays a description of a product, and for identifying that product. This may optionally be accomplished using a real time web page content analyzer 1104 that analyzes the content of a web page (to search for known product codes and descriptions) when the page is viewed by a user. The task of identifying product descriptions within web pages may additionally or alternatively be performed "off-line" using a web crawler program, in which case a table that maps URLs to products may be maintained by the system. Examples of metadata client and server architectures that provide these and other features are described in U.S. patent application Ser. No. 09/794,952, filed Feb. 27, 2001 (now U.S. Pat. 7,085,736), and Ser. Nos. 09/820,207, filed Mar. 28, 2001 (now U.S. Pat. 7,373,313), the disclosures of which are hereby incorporated by reference. Regardless of the particular product-identifying method used, the metadata client 1100 preferably reports to the metadata server 1102 information, such as the URL, about the web page currently being viewed on the computer on which the metadata client 1100 is installed.

To provide the above-described marketplace features using the World Wide Web (or a portion of the World Wide Web) as the products catalog, the metadata service preferably operates generally as follows. When a user of the service views a page that describes a product recognized by the metadata server 1102, the metadata server performs some or all of the following steps: (1) instruct the metadata client 1100 to display an option to sell a unit of the product; (2) search its own product listing database 562 to determine whether any marketplace listings exist for the product (and possibly related products); (3) if any pending marketplace or preorder listings are found in the product listings database in step (2), instruct the metadata client 1100 to display these listings in either a full or a summarized form; and (4) if no marketplace listings currently exist for the product, instruct the metadata client 1100 to display an option to preorder a unit of the product from an unspecified marketplace seller.

The metadata server 1102 thus notifies users of relevant product listings, and of the options to sell and preorder the products they view, as they browse various pages and web sites of the World Wide Web. Advantageously, a product listing created via a particular web page may be displayed in conjunction with many other web pages, including web pages of other web sites. Thus, although a seller may browse to a particular web page to create a marketplace listing for a product, that listing may be exposed to potential buyers via many hundreds or thousands of other web pages that describe the same product—including independent web pages created and hosted by many different independent entities. In addition, when a user browses to a web page that includes a description of a product, the user may view marketplace listings and/or preorder listings created by sellers via many different web pages, which may but need not include the one being viewed.

When a user selects an option to sell or preorder a product, or to purchase a product from a marketplace seller, the interactions are preferably the same as described above, except that the user communicates with the metadata server 1102—preferably via web pages served by a web server 540 of the metadata server. The metadata server 1102 may also provide web pages and functionality for registering marketplace sellers, allowing users to create marketplace listings from their respective purchase histories (which may be maintained by the metadata server as shown), and sending listing requests inviting those who previously purchased specific products to list such products in the marketplace. In addition, the metadata server 1102 may provide a bulk uploading service that operates as set forth above.

IX. Conclusion

Although the inventions have been described in terms of certain preferred embodiments, other embodiments will be apparent to those of ordinary skilled in the art, including embodiments that do not include all of the features and benefits set forth herein. Accordingly, the invention is defined only by the appended claims.

What is claimed is:

1. A system for supporting user-to-user sales of products, comprising:

a metadata client that runs in association with a browser on user computers; and a metadata server that communicates with the metadata client over a computer network to provide users with metadata for viewed web pages;

wherein the metadata client and server are responsive to a first user accessing a first web page that displays a description of a first product by providing to the first user an option to create a listing for selling a unit of the first product;

and wherein the metadata client and server are further responsive to a second user accessing a second web page that displays a description of the first product by notifying the second user of the product listing created by the first user and providing an option for the second user to make an associated purchase from the first user.

2. The system as in claim 1 wherein the metadata client and server include functionality for analyzing web page content to determine whether a recognized product is represented therein.

3. The system as in claim 1, wherein the first and second web pages are provided independently of the metadata client and server.

4. The system as in claim 1, wherein the first and second web pages are from different web sites.

5. The system as in claim 1, wherein the metadata client and metadata server collectively enable users to create listings for selling products represented on web pages, and to view listings created by other users for selling such products, across a plurality of web sites hosted by a plurality of independent entities.

6. The system as in claim 1, wherein the metadata client and metadata server collectively enable users to create listings for selling the first product, and to view listings created by other users for selling the first product, via web pages of each of a plurality of web sites of each of a plurality of entities.

7. The system as in claim 1, wherein the metadata client is a browser plug-in.

8. A system for facilitating user-to-user sales of products, comprising:

a metadata client component that runs on user computers in conjunction with a web browser to provide web page metadata to users during browsing of web pages;

a metadata server component that servers the metadata to the metadata client component;

wherein the metadata client and server components collectively implement a user-to-user sales service in which (a) when a first user accesses a first web page that describes a first product, the first user is provided an option to create a sales listing for selling the first product; and (b) following generation of the sales listing by the first user, when a second user accesses a second web page that describes the first product, the listing is exposed to the second user, and the second user is given an option to purchase the first product from the first user.

9. The system as in claim 8, wherein the first and second web pages are provided independently of the metadata client and server components.

10. The system as in claim 8, wherein the first and second web pages are from different web sites.

11. The system as in claim 8, wherein the metadata server component includes functionality for analyzing web page content to determine whether a recognized product is represented therein.

12. The system as in claim 8, wherein the metadata client component and metadata server component collectively implement the user-to-user sales service across a plurality of web sites of a plurality of entities.

13. The system as in claim 8, wherein the metadata client component and metadata server component collectively implement the user-to-user sales service across substantially the entire World Wide Web.

14. The system as in claim 8, wherein the metadata client component and metadata server component collectively enable users to create listings for selling products represented on web pages, and to view listings created by other users for selling such products, across a plurality of web sites hosted by a plurality of independent entities.

15. The system as in claim 8, wherein the metadata client component is a browser plug-in.

16. The system as in claim 8, wherein the metadata server component comprises a memory which stores a table that maps URLs to products.

* * * * *

UNITED STATES PATENT AND TRADEMARK OFFICE
CERTIFICATE OF CORRECTION

PATENT NO. : 7,497,369 B2
APPLICATION NO. : 10/142743
DATED : March 3, 2009
INVENTOR(S) : Dalzell et al.

It is certified that error appears in the above-identified patent and that said Letters Patent is hereby corrected as shown below:

At col. 17, line 42, after "Options", change "of" to --on--.

At col. 26, line 56, after "patent", change "application" to --applications--.

At col. 28, line 49, change "pages" to --pages, the metadata server comprising computer hardware--.

At col. 29, line 22 (i.e., line 6 of claim 8), change "servers;" to --serves--.

At col. 29, line 23 (i.e., line 7 of claim 8), change "component" to --component, the metadata server component comprising computer hardware--.

At col. 29, lines 26 and 27 (i.e., lines 10 and 11 of claim 8), change "that describes" to --describing--.

At col. 29, line 31 (i.e., line 15 of claim 8), change "that describes" to --describing--.

Signed and Sealed this

Twenty-fifth Day of August, 2009

David J. Kappos
*Director of the United States Patent and Trademark Office*